United States Patent
Barakat et al.

(10) Patent No.: US 11,018,872 B2
(45) Date of Patent: May 25, 2021

(54) VALIDATING AND SECURING CALLER IDENTIFICATION TO PREVENT IDENTITY SPOOFING

(71) Applicant: Verizon Patent and Licensing Inc., Arlington, VA (US)

(72) Inventors: Lulia Ann Barakat, McKinney, TX (US); Jeffrey Haltom, Fishers, IN (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 289 days.

(21) Appl. No.: 16/037,951

(22) Filed: Jul. 17, 2018

(65) Prior Publication Data
US 2020/0028690 A1 Jan. 23, 2020

(51) Int. Cl.
*H04L 29/06* (2006.01)
*H04L 9/32* (2006.01)
*H04L 9/30* (2006.01)
*H04L 9/08* (2006.01)

(52) U.S. Cl.
CPC .......... *H04L 9/3247* (2013.01); *H04L 9/0894* (2013.01); *H04L 9/30* (2013.01); *H04L 63/1483* (2013.01); *H04L 65/1006* (2013.01); *H04L 65/1016* (2013.01); *H04L 65/1076* (2013.01)

(58) Field of Classification Search
CPC ....... H04L 9/3247; H04L 9/0894; H04L 9/30; H04L 63/1483; H04L 65/1006; H04L 65/1016; H04L 65/1076
See application file for complete search history.

(56) References Cited

U.S. PATENT DOCUMENTS

| | | | |
|---|---|---|---|
| 10,051,011 B2 * | 8/2018 | Boerjesson | H04L 61/106 |
| 10,149,156 B1 * | 12/2018 | Tiku | H04L 9/3234 |
| 2015/0189080 A1 * | 7/2015 | Lin | H04M 3/436 |
| | | | 379/142.05 |
| 2015/0236857 A1 * | 8/2015 | Feltham | H04M 1/663 |
| | | | 380/270 |
| 2016/0099963 A1 * | 4/2016 | Mahaffey | H04L 63/0227 |
| | | | 726/25 |

(Continued)

OTHER PUBLICATIONS

Internet Engineering Task Force (IETF), Request for Comments (RFC) 8224, J. Peterson et al., "Authenticated Identity Management in the Session Initiation Protocol (SIP)," Feb. 2018, 46 pages.

*Primary Examiner* — Sarah Su

(57) ABSTRACT

A device receives call information associated with a call from a first user device to a second user device, where the first user device is associated with a first network, and the second user device is associated with a second network separate from the first network. The call information includes a caller identification and is received via an originating network device of the first network. The device determines whether the caller identification is verified, and adds authentication information to the call information when the caller identification is verified. The device receives the call information and the authentication information from a terminating network device of the first network, and removes the authentication information from the call information. The device adds a cryptographic signature to the call information, and causes the call information and the cryptographic signature to be provided to the second network for routing to the second user device.

20 Claims, 28 Drawing Sheets

(56) References Cited

U.S. PATENT DOCUMENTS

| | | | |
|---|---|---|---|
| 2016/0366193 A1* | 12/2016 | Lawson | G06F 9/541 |
| 2017/0264443 A1* | 9/2017 | Tu | H04L 9/3268 |
| 2018/0026973 A1* | 1/2018 | Le Saint | G06F 21/6218 |
| | | | 713/168 |
| 2018/0103144 A1* | 4/2018 | Gupta | H04M 3/382 |
| 2018/0115560 A1* | 4/2018 | Green | H04M 3/42059 |
| 2018/0249006 A1* | 8/2018 | Dowlatkhah | H04W 8/18 |
| 2018/0294959 A1* | 10/2018 | Traynor | H04L 9/0844 |
| 2018/0295140 A1* | 10/2018 | Lu | H04L 65/1076 |
| 2020/0336314 A1* | 10/2020 | Barakat | H04L 65/1016 |

* cited by examiner

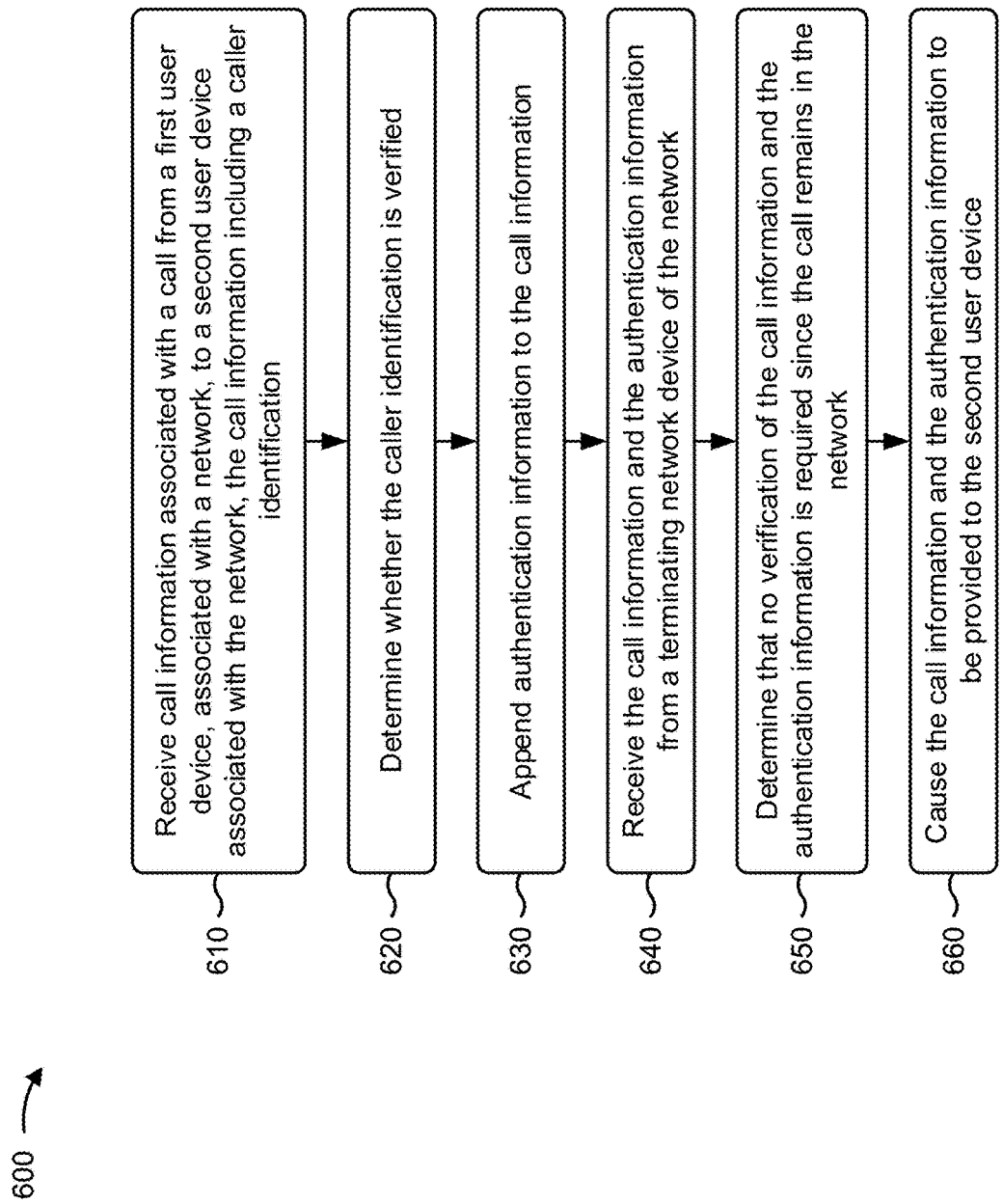

```
POST /stir/v1/signing HTTP/1.1
Host : stir.vz.com
Accept : application/json
X-RequestID: AA97B177-9383-4934-8543-0F91A7A02836
Content-Type: application/json
Content-Length : ...
{
    "signingRequest": {
        "attest": "A",
        "orig": {"tn": "12155551212"},
        "dest": {"tn": ["12355551212"]},
        "iat": 1443208345,
        "origid": "de305d54-75b4-431b-adb2-eb6b9e546014"
    }
}
```

FIG. 7A

```
POST  /stir/v1/signing  HTTP/1.1
Host : stir.vz.com
Accept : text/html
X-RequestID: AA97B177-9383-4934-8543-0F91A7A02836
Content-Type: text/plain
Content-Length : ...
         {INVITE sip:1235551212@vzims.com:5061;transport=tcp SIP/2.0
         ...
         ...
         To: <sip:+1235551212@vzims.com;user=phone>
         From: <sip:+1215551212@vzims.com;user=phone>;tag=9b3ff608
         Contact: <sip:+1215551212@vzims.com;user=phone>
         P-Asserted-Identity:  sip:+1215551212@vzims.com;user=phone ;
         "verstat" : "TN-Authentication-Passed"
         "P-Attestation" : "A",
         "P-origination-ID : "de305d54-75b4-431b-adb2-eb6b9e546014",
         ...
         }
```

FIG. 7B

```
HTTP/1.1 200 Ok
X-RequestID: AA97B177-9383-4934-8543-0F91A7A02836
Content-Type : application/json
Content-Length : ...

{
  "signingResponse": {
    "identity" :
"eyJhbGciOiJFUzI1NiIsInR5cCI6InBhc3Nwb3J0IiwicHBTjoic2hha2VuIiwieDV1IjoiaHR0c
Dov
L2N1cnQtYXV0aC5wb2Muc3lzLmNvbWNhc3QubmV0L2V4YW1wbGUuY2VydCJ9eyJhdHRlc3QiOiJBIi
wiZGVzdCI6eyJ0biI6IisxMjE1NTU1MTIxMyJ9LCJpYXQiOiIxNDcxMzc1NTU4Iiwib3JpZyI6eyJ0
biI64oCdKzEyMTU1NTUxMjEyIn0sIm9yaWdpZCI6IjEyM2U0NTY3LWU4OWItMTJkMy1hNDU2LTQyNj
Y1NTQ0MDAwMCJ9._28kAwRWnheXyA6nY4MvmK5JKHZH9hSYkWI4g75mnq9Tj2lW4WPm0P1vudoGaj7
wM5XujZUTb_3MA4modoDtCA;info=<http://cert.example2.net/example.cert>"
}
}
```

FIG. 7C

```
HTTP/1.1 200 Ok
X-RequestID: AA97B177-9383-4934-8543-0F91A7A02836
Content-Type : text/plain
Content-Length : ...
{
    INVITE sip:1235551212@vzims.com SIP/2.0
    ...
    ...
    To: <sip:+1235551212@vzims.com;user=phone>
    From: <sip:+1215551212@vzims.com;user=phone>;tag=9b3ff608
    Date: 2017-02-23 16:05:34 (GMT)
    Identity: ..rq3pjT1hoRwakEGjHCnWSwJnshd0-zJ6F1VOgFWSjHBr8Qj \
    pjlk-cpFYpFYsojNCpTzO3QfPO1ckGaS6hEck7w; info=https://
    biloxi.example.org/biloxi.cert
    ...
}
```

FIG. 7D

```
HTTP/1.1 400 Bad Request
X-RequestID: AA97B177-9383-4934-8543-0F91A7A02836
Content-Type : application/json
Content-Length : ...
{
    "requestError": {
        "serviceException": {
            "messageId": "SVC4501"
            "text": "Error: Invalid Content.
Missing mandatory parameter '%1'",
            "variables": ["iat"]
        }
    }
}
```

FIG. 7E

```
POST /stir/v1/verification HTTP/1.1
Host : stir.vzims.com
Accept : application/json
X-RequestID: AA97B177-9383-4934-8543-0F91A7A02836
Content-Type: application/json Content-Length : ...
{
  "verificationRequest": {
    "orig": {"tn": "12155551212"},
    "dest": {"tn" : ["12355551212"]},
    "iat": 1443208345,
    "identity" :
    "eyJhbGciOiJFUzI1NiIsInR5cCI6InBhc3Nwb3J0IiwicHB0Ijoic2hha2VuIiw
ieDV1IjoiaHR0cDovL2N1cnQtYXV0aC5wb2Muc3lzLmNvbWNhc3QubmV0L2V4YW1
wbGUuY2VydCJ9eyJhdHRlc3QiOiJBIiwiZGVzdCI6eyJ0biI6IisxMjE1NTU1MTI
xMyJ9LCJpYXQiOiIxNDcxMzc1NDE4IiwibB3JpZyI6eyJ0biI64oCdKzEyMTU1NTU
xMjEyIn0sIm9yawdpZCI6IjEyM2U0NTY3LWU4OWItMTJkMy1hNDU2LTQyNjY1NTQ
0MDAwMCJ9._28kAwRWnheXyA6nY4MvmK5JKHZH9hSYkWI4g75mnq9Tj2lw4wPm0P
lvudoGaj7wM5XujZUTb_3MA4mododTcA;info=<http://cert.example2.com/
example.cert>"
}
}
```

FIG. 8A

```
POST /stir/v1/verification HTTP/1.1
Host : stir.vz.com
Accept : text/html
X-RequestID: AA97B177-9383-4934-8543-0F91A7A02836
Content-Type: text/plain
Content-Length : ...
{
    INVITE sip:12355551212@carrier.com SIP/2.0
    To: <sip:+12355551212@carrier.com;user=phone>
    From: <sip:+12155551212@carrier.com;user=phone>;tag=9b3ff608
    P-Asserted-Identity: <sip:+12155551212@carrier.com;user=phone>
    Date: 2017-02-23 16:05:34 (GMT)
    Identity:
    eyJhbGciOiJFUzI1NiIsInR5cCI6InBhc3Nwb3J0IiwicHB0Ijoic2hha2VuIiwi
    eDV1IjoiaHR0cDov
    L2NlcnQtYXV0aC5wb2Muc3lzLmNvbWNhc3QubmV0L2V4YW1wbGUuY2VydCJ9eyJh
    dHRlc3QiOiJBIiwiZGVzdCI6eyJ0biI6IisxMjE1NTU1MTIxMyJ9LCJpYXQiOiIx
    NDcxMzc1NDE4IiwibjJpZyI6eyJ0biI6IisxNjQoCdKzEyMTU1NTUxMjEyIn0sIm9yaWdp
    ZCI6IjEyM2U0NTY3LWU4OWItMTJkMy1hNDU2LTQyNjY1NTQ0MDAwMCJ9.__28kAwR
    WnheXyA6nY4MvmK5JKHZH9hSYkwI4g75mnq9Tj2lw4WPm0PlvudoGaj7wM5XujZU
    Tb_3MA4modoDtCA;info=http://cert.example2.com/example.cert
}
}
```

FIG. 8B

```
HTTP/1.1 200 Ok
X-RequestID: AA97B177-9383-4934-8543-0F91A7A02836
Content-Type : application/json
Content-Length : ...
{
    "verificationResponse": {
        "verstat": "TN-Validation-Passed"
    }
}
```

FIG. 8C

```
HTTP/1.1 200 Ok
X-RequestID: AA97B177-9383-4934-8543-0F91A7A02836
Content-Type : text/plain
Content-Length : ...

{
    INVITE sip:1235551212@carrier.com SIP/2.0
    To: <sip:+1235551212@carrier.com;user=phone>
    From: <sip:+12155551212@carrier.com;user=phone>;tag=9b3ff608
    P-Asserted-Identity: <sip:+12155551212@carrier.com;verstat=TN-
    Validation-Passed;user=phone>
    Date: 2017-02-23 16:05:34 (GMT)
    ...
}
```

FIG. 8D

```
HTTP/1.1 200 Ok
X-RequestID: AA97B177-9383-4934-8543-0F91A7A02836
Content-Type : application/json
Content-Length : ...

{
"verificationResponse": {
    "reasoncode": 436200,
    "reasontext": "Bad Identity Info",
    "reasondesc": "Info URI dereferencing failure",
    "verstat": "TN-Validation-Failed"
    }
}
```

FIG. 8E

```
HTTP/1.1 400 Bad Request
X-RequestID: AA97B177-9383-4934-8543-0F91A7A02836
Content-Type : application/json
Content-Length : ...
{
    "requestError": {
        "serviceException": {
            "messageId": "SVC4501"
            "text": "Error: Invalid Content. Missing mandatory parameter '%1'",
            "variables": ["iat"]
        }
    }
}
```

FIG. 8F

```
POST  /stir/v1/tagging   HTTP/1.1
Host : stir.vz.com
Accept : application/json
X-RequestID: AA97B177-9383-4934-8543-0F91A7A02836
Content-Type: application/json
Content-Length : ...
{
  "taggingRequest": {
       "attest": "A",
       "orig": {"tn": "12155551212"},
       "dest": {"tn" : ["12355551212"]},
       "iat": 1443208345,
       "origid": "de305d54-75b4-431b-adb2-eb6b9e546014"
  }
}
```

FIG. 9A

```
POST /stir/v1/tagging  HTTP/1.1
Host : stir.vz.com
Accept : text/html
X-RequestID: AA97B177-9383-4934-8543-0F91A7A02836
Content-Type: text/plain
Content-Length : ...
{
    INVITE sip:12355551212@vzims.com:5061;transport=tcp SIP/2.0
    ..
    ..
    To: <sip:+12355551212@vzims.com;user=phone>
    From: <sip:+12155551212@vzims.com;user=phone>;tag=9b3ff608
    Contact: <sip:+12155551212@vzims.com;user=phone>
    P-Asserted-Identity: <sip:+12155551212@vzims.com;user=phone>
}
```

FIG. 9B

```
HTTP/1.1 200 Ok
X-RequestID: AA97B177-9383-4934-8543-0F91A7A02836
Content-Type : application/json
Content-Length : ...

{
    "taggingResponse": {
    "P-Attestation" : "A",
    "P-origination-ID : "de305d54-75b4-431b-adb2-eb6b9e546014",
    "verstat" : "TN-Authentication-Passed"
    }
}
```

FIG. 9C

```
HTTP/1.1 200 Ok
X-RequestID: AA97B177-9383-4934-8543-0F91A7A02836
Content-Type : text/plain
Content-Length : ...

{
    INVITE sip:12355551212@vzims.com:5061;transport=tcp SIP/2.0
    ...
    ...
    To: <sip:+12355551212@vzims.com;user=phone>
    From: <sip:+12155551212@vzims.com;user=phone>;tag=9b3ff608
    Contact: <sip:+12155551212@vzims.com;user=phone>
    P-Asserted-Identity: sip:+12155551212@vzims.com;user=phone;
    "verstat" : "TN-Authentication-Passed"
    "P-Attestation" : "A",
    "P-origination-ID : "de305d54-75b4-431b-adb2-eb6b9e546014",
    ...
}
```

FIG. 9D

VALIDATING AND SECURING CALLER IDENTIFICATION TO PREVENT IDENTITY SPOOFING

BACKGROUND

Identity spoofing refers to an action of assuming an identity of some other entity (e.g., human or non-human), and utilizing the identity to accomplish an inappropriate goal. For example, an identity spoofing technique may generate messages that appear to come from a different entity and/or may utilize stolen or spoofed authentication credentials.

A robocall is a telephone call that utilizes a computerized auto-dialer to deliver a pre-recorded message, or automatically establish a call with a call center operator. Robocalls have become common in connection with political campaigns, telemarketing campaigns, public service announcements, and/or the like, and people may wish to avoid receiving such unsolicited calls. Various techniques can be used to avoid unwanted robocalls, both automated (for example, through "do-not-call" lists) and manual (for example, by receiving "caller identifier" information and reviewing it prior to accepting the call). However, recently robocalls have become associated with identity spoofing techniques in order to falsify or obscure the true source of the call. These techniques have made it difficult for end users to avoid unwanted call attempts, resulting in annoyance to users, distrust of the caller information being provided with calls, and in egregious cases, frauds perpetrated on users.

BRIEF DESCRIPTION OF THE DRAWINGS

FIG. 6 is a flow chart of an example process for validating and securing caller identification to prevent identity spoofing.

FIGS. 7A-7E are diagrams of example application programming interfaces (APIs) capable of being utilized in implementations described herein.

FIGS. 8A-8F are diagrams of additional example APIs capable of being utilized in implementations described herein.

FIGS. 9A-9D are diagrams of still additional example APIs capable of being utilized in implementations described herein.

DETAILED DESCRIPTION OF PREFERRED EMBODIMENTS

Figure 1A:
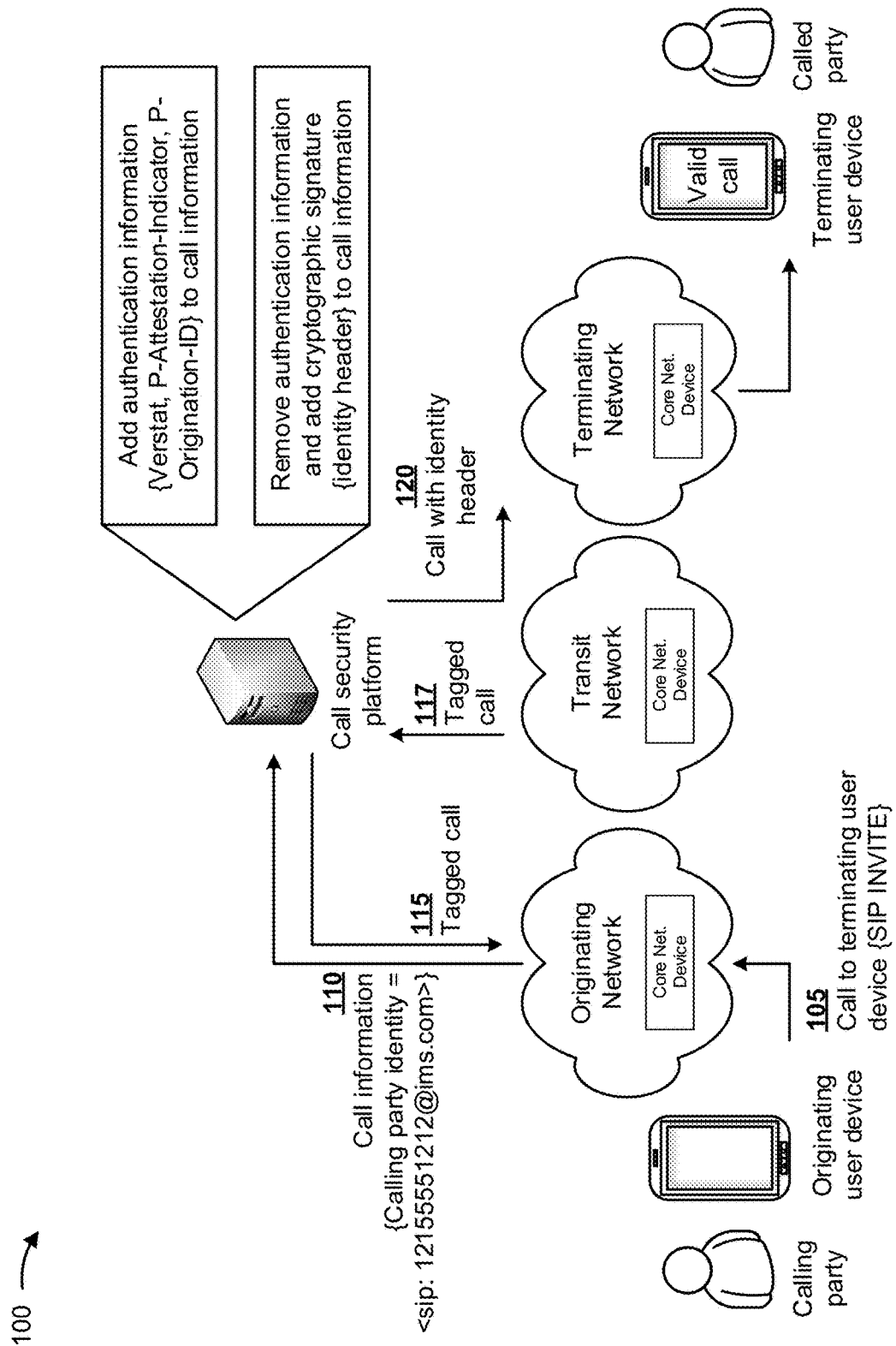
FIGS. 1A-1H are diagrams of example implementations described herein.

The following detailed description of example implementations refers to the accompanying drawings. The same reference numbers in different drawings may identify the same or similar elements.

The proliferation of identity spoofing, combined with robocalling, often leads to unsuspecting consumers falling victim to scams, such as scams associated with impersonation of government agencies, free travel offers, financial loan support, software technical support, and/or the like. Identity spoofing and robocalls also devalue real-time communication processes and annoy customers. "Blacklists" (i.e. lists of calling party identifiers from which calls should be blocked) may be utilized with anti-robocalling tools and applications, but are easily thwarted by identity spoofing techniques.

Some implementations described herein provide a call security platform that validates and secures caller identification to address identity spoofing and restore user confidence in caller identification information provided with call requests. For example, the call security platform may receive call information associated with a call from a first user device to a second user device, where the first user device is associated with an originating network, and the second user device is associated with a destination network separate from the originating network. The call information may include a caller identification and may be received via a first network device of the originating network. The call security platform may determine whether the caller identification is verified, and may add authentication information to the call information when the caller identification is verified. The call security platform may also receive the call information and the authentication information from a second network device of the originating network, and may remove the authentication information from the call information. The call security platform may add a cryptographic signature to the call information, and may cause the call information and the cryptographic signature to be provided to the destination network for routing to the second user device.

The call security platform may further receive the call information including the cryptographic signature from a third network device of the destination network, and perform a verification of the cryptographic signature. The result of the verification may then be included in the call information, for example, indicating whether the call information has been validated or not. The verification result may be indicated to the second user device, such that the user may make a decision as to whether to accept the call request.

In the context of the present discussion, a "call" should be interpreted to mean a communication session between two or more endpoints—for example, a "calling party" or "originating" user device and a "called party" or "terminating" user device—for real-time information exchange. The real-time information supported by the communication session may encompass one or more media types (e.g., voice (audio) and video). A typical use case would be a voice communication session between a calling party and a called party, but implementations of a video communication session between a calling party and a called party, or an audio/video communication session between a calling party and multiple called parties, may also be consistent with the examples described herein.

FIGS. 1A-1H are diagrams of example implementations 100 described herein. As shown in FIG. 1A, an originating user device may be associated with an originating network, and a terminating user device may be associated with a terminating network that is separate from the originating network (e.g., networks that are owned by unrelated entities such that varying levels of trust can be ascribed to each network). FIG. 1A can be described as depicting an inter-network call scenario, where a call request must traverse at least two separate networks. In some implementations, the originating network may communicate with the terminating network via a transit network.

A call security platform is provided that may communicate with the originating network, the terminating network, and (in some cases) the transit network. In some implementations, the call security platform may utilize a Secure Telephone Identity Revisited (STIR) framework (as described in Internet Engineering Task Force RFC 8224) to define the use of core protocols and technologies for applying digital signatures to validate an identity of a calling party during session initiation using the Session Initiation Protocol (SIP). In some implementations, the call security platform may a utilize signature-based handling of asserted information using tokens (SHAKEN) framework to define utilization of STIR and how network service providers are to interwork calls between separate networks. The call security platform may utilize the STIR framework to provide an anti-spoofing SIP-based system that authenticates a SIP originating call using a cryptographic signature (e.g., an identity header) that can be verified by a terminating SIP network device.

In some implementations, the call security platform may utilize the STIR/SHAKEN framework to support validation of incoming calls that contain a cryptographic signature. In some implementations, the call security platform may utilize the STIR/SHAKEN framework to support signing of legitimate calls originating on networks, and downstream authentication via a cryptographic signature. In some implementations, the call security platform may utilize the STIR/SHAKEN framework to support transport of the cryptographic signature across trust boundaries (e.g., across different networks).

In some implementations, the call security platform may assure that an identity provided in a call is accurate according to a party that has authority over the identity (e.g., a service provider), and has not been altered as the call traverses one or more networks. This is achieved by the call security platform by providing a cryptographic signature to the call using a private key. The call security platform may decrypt a cryptographic signature using a public key to verify that the call information has not be altered in transit and that the service provider that applied the cryptographic signature is vouching for an accuracy of the call information. Such a validation may permit users to make informed decisions regarding incoming calls and may enable analytics to be more accurately applied to incoming calls (e.g., for determining whether calls may be spam, robocalls, or have spoofed identities).

As shown in FIG. 1A, and by reference number 105, a calling party of the originating user device may cause the originating user device to generate a call request to the terminating user device. In some implementations, the call may include a SIP INVITE message that includes call information, such as a calling party identity indicating information associated with the calling party, the originating user device, and/or the like. In some implementations, the calling party identity may include a uniform resource identifier (URI), provided in a source ("from") header field of the SIP INVITE (e.g., sip: 12155551212@ims.com), that identifies a telephony number (e.g., an E.164 number) associated with the originating user device (e.g., a North American Numbering Plan number). As further shown in FIG. 1A, the originating user device may provide the SIP INVITE with the call information to the originating network.

As further shown in FIG. 1A, and by reference number 110, the call security platform may receive the call information from the originating network. In some implementations, an originating network device of the originating network (e.g., an originating Internet Protocol multimedia subsystem (IMS) core network device—such as a session border controller—a non-IMS application server, etc.) may receive the call information in the SIP INVITE (or may derive call information from the SIP INVITE, for example, based on the origination information associated with the message, such as the source IP address, incoming port number, etc.), and may initiate a request to the call security platform. In such implementations, the call security platform may receive the call information from the network device of the originating network based on the request.

In some implementations, the call security platform may determine whether the calling party identity of the call can be verified based on information provided by a service provider of the originating network. For example, if the service provider of the originating network can verify the calling party identity (e.g., as a calling party legitimately subscribed to the service provider, using a known ingress path—source IP address, ingress port number, layer 2 source address, source domain—or other indications of authenticity), the service provider may provide, to the call security platform, information indicating that the calling party identity is verified. In some implementations, and as further shown in FIG. 1A, the call security platform may add authentication information for the call information to generate a "tagged" call (e.g., the call tagged with the authentication information). In such implementations, the authentication information may indicate that the calling party identity is verified (e.g., not a spoofed identity), and that the calling party identity may be valid and trusted.

The authentication information may include, for example, a verification status (e.g., verstat), an attestation indicator (e.g., P-attestation-indicator), an origination identity (e.g., P-origination-ID), and/or the like. The verification status may indicate that the calling party identity (e.g., the telephony number of the originating user device) passed validation and authentication (e.g., TN-validation-passed), that the calling party identity failed validation and authentication (e.g., TN-validation-failed), that no validation or authentication of the calling party identity was performed (e.g., No-TN-validation), and/or the like. The attestation indicator may indicate that the service provider of the originating network is responsible for the origination of the call onto the originating network, has a direct authenticated relationship with the calling party and can identify the calling party, has established a verified association with the telephone number used for the call, and/or the like. If one or more the previous conditions are not satisfied, the attestation indicator may indicate that the call is partially attested or not attested. The origination identity may provide a unique identity (e.g., a universal unique identity (UUID)) for the calling party, the call, the originating user device, and/or the like.

As further shown in FIG. 1A, and by reference number 115, the call security platform may provide the call information including the authentication information to the originating network (for example, the originating network device that requested the verification). The originating network may provide the SIP INVITE with the authentication information to a transit network in order to route it to its ultimate destination. In this example the transit network is controlled by the same service provider as the originating network, and therefore a high degree of trust exists that the verification performed by the originating network was accurate and the SIP INVITE will not be modified as it traverses the transit network. The transit network may receive the SIP INVITE at a transit network device (e.g., an IMS core network device, a non-IMS core network device) which implements a network-to network interface with the terminating network. Upon determining that the SIP INVITE is to be sent to the terminating network (which is not a trusted network), the transit network device sends a request (reference number 117) to the call security platform for a signing action prior to sending the SIP INVITE to the terminating network. In some implementations where the transit network is not used, the originating network may include a second originating network device (e.g., an IMS core network device) implementing the network-to-network interface with the terminating network. In such implementations, the second originating network device—sometimes referred to as an egress device—may make the request to the call security platform.)

As further shown in FIG. 1A, upon receiving the request from transit network device, the call security platform may remove the authentication information from the call information. Removal of the authentication information is useful to prevent downstream networks from seeing the authentication information—which may include customized information of the service provider, or may be misused as trusted authentication information (which is not secure after its exit from the service provider controlled network). The call security platform may add an identity header (e.g., a cryptographic signature) to the call information. In some implementations, the call security platform may be associated with a storage device that stores private keys used by an authentication service associated with the originating service provider. The call security platform may securely request a private key from the storage device, and may receive the private key from the storage device based on the request. The call security platform may utilize the private key to sign the call information (or any portion thereof, such as the telephony number), and to generate the identity header.

As further shown in FIG. 1A, and by reference number 120, the call security platform may then cause the SIP INVITE with the identity header to be sent to the terminating network. In some implementations, the call information is provided by the call security platform to the transit network device that requested the signing action, and the transit network device provides the SIP INVITE now including the identity header to the terminating network. The terminating network may then route the SIP INVITE to the terminating user device. In some implementations, the terminating network and/or terminating user device may receive the SIP INVITE with the identity header, and may utilize the identity header to validate that the calling party identity is accurate (described more fully below in FIG. 1B). The terminating user device may display (e.g., via a user interface) information indicating that the calling party identity for the call has been determined to be valid. With assurance that the caller identification is valid, the called party may choose to answer the call with the terminating user device, or perform other processing actions (e.g., blocking, forwarding, etc.).

Figure 1B:
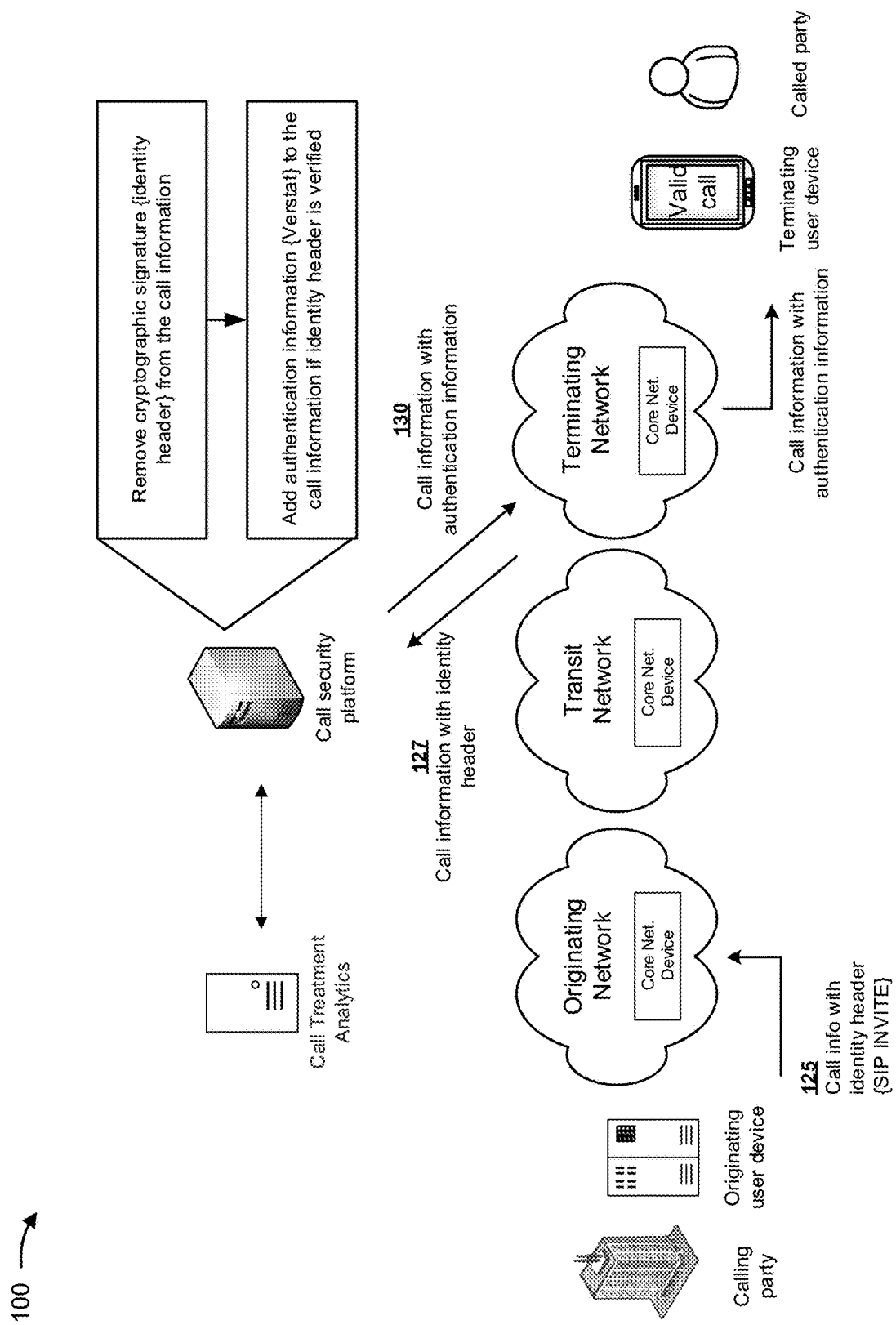

FIG. 1B shows another example of an inter-network calling scenario. As shown in FIG. 1B, and by reference number 125, the calling party of the originating user device may cause the originating user device to generate a call request, with call information, to the terminating user device. In some implementations, the call information may include the identity header (e.g., the cryptographic signature) described above. As further shown in FIG. 1B, and by reference number 125, the originating user device may provide a SIP INVITE with the call information including the identity header to the originating network. The originating user device in this example may be part of an enterprise or wholesale connection to the originating network, such that the call security platform may be used to sign such inbound call requests. The originating network may then provide the SIP INVITE with the call information including the identity header to the transit network. The SIP INVITE reaches the transit network device, which then forwards the SIP INVITE to the terminating network. In this example, the originating network and transit network may not request call security platform processing of the SIP INVITE—for example, the networks may not support call security, or the policy of the networks may exclude inbound call requests that have already been signed from call security processing, among other reasons.

The SIP INVITE may be received at a terminating network device (e.g., an IMS core network device or non-IMS core network device) associated with the terminating network. In such implementations, the terminating network device may request that the call security platform perform a verification action (e.g., by providing the call information with the identity header to the call security platform) before providing the call to the terminating user device (reference number 127).

As further shown in FIG. 1B, the call security platform may remove the identity header (e.g., the cryptographic signature) from the call information. In some implementations, the call security platform may utilize an information parameter provided in the identity header to determine an identifier (e.g., a URI) of a certificate repository associated with the call security platform. The certificate repository may include a publically accessible storage device for public key certificates that are validated by owners of the public key certificates. Based on the URI, the call security platform may request a public key certificate from the certificate repository, and may receive a public key certificate based on the request.

In some implementations, the call security platform may validate the public key certificate received from the certificate repository, and may extract a public key from the public key certificate. The call security platform may utilize the public key to determine whether the cryptographic signature in the identity header is verified, which may validate a calling party identity used when cryptographically signing the call information with a private key associated with an originating service provider. In some implementations, the call security platform may also perform call analytics and/or other mitigation techniques to determine if the call is illegitimate (e.g., spam, spoofed, unsecure, etc.), and may determine a response to be signaled to the terminating user device for a legitimate call or an illegitimate call based on the call analytics and/or the other mitigation techniques. For example, the call security platform may include or communicate with a call treatment analytics system that analyzes call information and applies various techniques (e.g., rules processing, machine learning, fuzzy logic) to determine the likely source of the call and the appropriate classification for the call. Since the SIP INVITE includes an identity header, the call security platform may take this into account in analyzing the caller identity information (e.g., that the caller identity information can be verified according to its source).

As further shown in FIG. 1B, the call security platform may add authentication information to the call information. The authentication information may include for example, a verification status (e.g., verstat), as described above in connection with FIG. 1A. As shown in FIG. 1B, and by reference number 130, the call security platform may provide the call information with the authentication information to the terminating network device, and the terminating network device may route the SIP INVITE with the call information including the authentication information to the terminating user device. In some implementations, the terminating user device may receive the SIP INVITE, and may utilize the authentication information to determine how to indicate that the calling party identifier is valid or not. For example, the terminating user device may display (e.g., via a user interface) information indicating that the caller identity is valid to the called party. With assurance that the caller identity is valid, the called party may choose to answer the call with the terminating user device, or invoke other call processing actions.

Figure 1C:
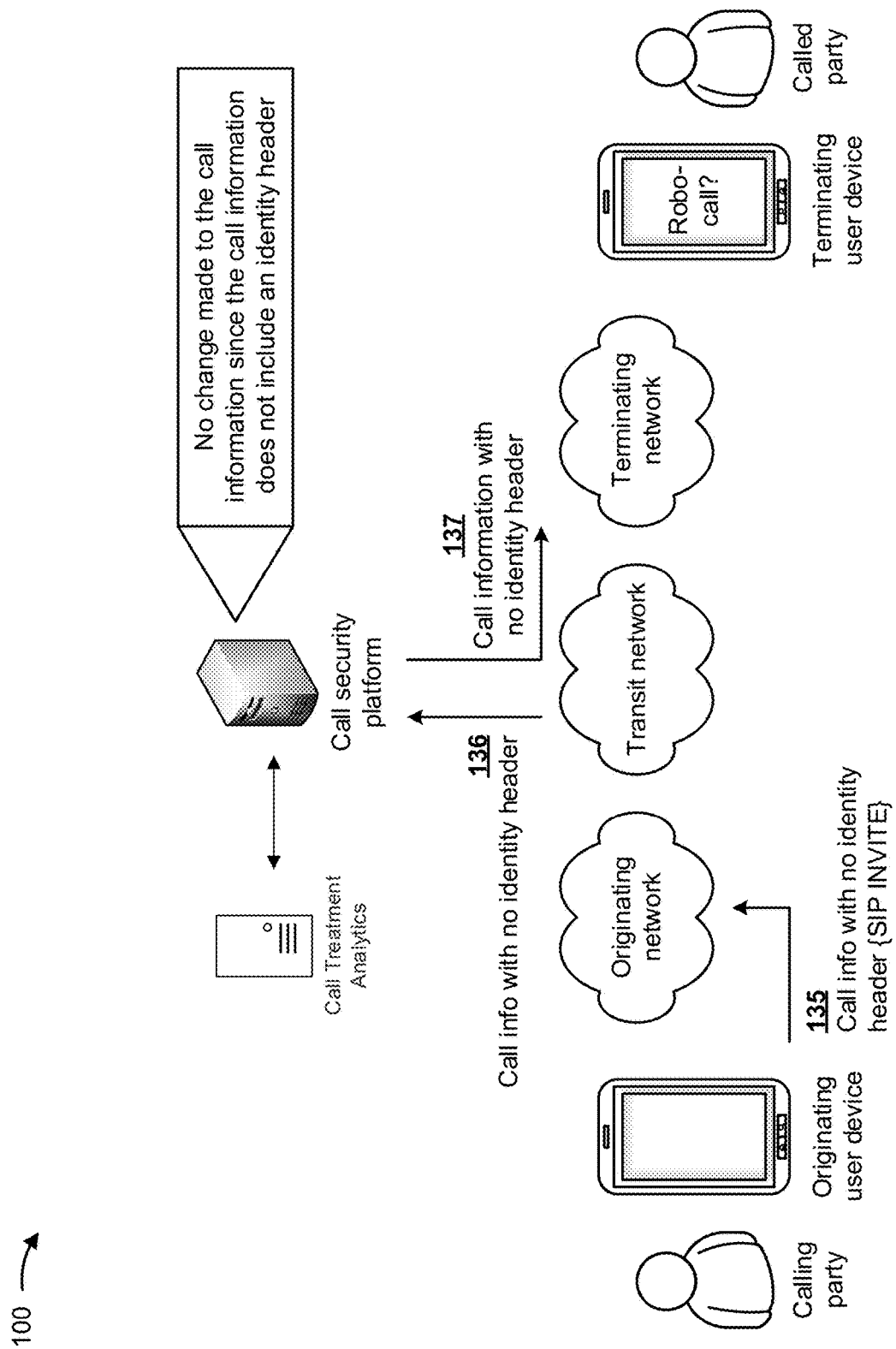

FIG. 1C shows another example of an inter-network calling scenario involving three separate networks—an originating network, a transit network, and a terminating network—not under common control, and therefore mutually untrusted. As shown in FIG. 1C, and by reference number 135, the calling party of the originating user device may cause the originating user device to generate a call request, with call information, to the terminating user device. In some implementations, the call information may not include the identity header (e.g., the cryptographic signature) described above. As further shown in FIG. 1C, and by reference number 135, the originating user device may provide the SIP INVITE with call information and no identity header to the originating network. In this example, the originating network does not use the call security platform, and may provide the SIP INVITE with call information and no identity header to the transit network for delivery to the terminating user device.

The transit network does use the call security platform, and requests verification of the call information by the call security platform (reference number 136). As further shown in FIG. 1C, the call security platform may determine that the SIP INVITE originated outside the transit network from a user that is not a subscriber to the transit network, and because there is no identity header that has cryptographically signed the provided call information, therefore its contents cannot be verified as authentic. In this example, the call security platform does not change the call information. In some implementations, the call security platform removes any authentication information that may have been included in the SIP INVITE provided to the originating network. This prevents this information from being used to claim verification by a downstream network device. In some implementations, the call security platform may add authentication information (verification status, attestation indicator and origination ID), which indicates that verification could not be made. For example, the attestation indicator may be coded to reflect the level of attestation made—"A"—Full attestation, caller identity is accurate, "B"—Partial attestation, caller identity may not be accurate, "C"—No attestation, cannot make any assessment, but marking that the call did transit the network. This coding may be useful for further intra-network processing or later troubleshooting or traceback forensics. In this example, a "C" attestation may be appropriate for a SIP INVITE that is received from outside the originating network with no connection to the originating network.

As some point, the transit network determines that the call request is destined for the terminating network (e.g., on initial receipt or as it traverses the transit network). The call security platform may be invoked to perform a signing activity for the SIP INVITE. (The signing activity may be subsequent to or as part of the same transaction as the verification activity described above.) The call security platform determines that the call information has not been sufficiently verified due to the analysis noted above—in some implementations, it may use the authentication information to determine that less than Full Attestation has been made. Upon determining that the call information has not been verified, the call security platform does not sign the call information and does not provide an identity header for the SIP INVITE. It may also remove the authentication information.

As further shown in FIG. 1C, and by reference number 137, the transit network may provide the SIP INVITE to the terminating network. The terminating network received the SIP INVITE at a terminating network device (e.g., an IMS core network device or a non-IMS core network device), and may request that the call security platform may perform validation. The call security platform may invoke the verification activity and may also apply call analytics and/or other mitigation techniques on the call to determine if the call is illegitimate (e.g., spam, spoofed, unsecure, etc.) as described above in FIG. 1B. Since the SIP INVITE does not include an identity header, the call security platform may take this into account in analyzing the caller identity information (e.g., that the call request cannot be verified). The call security platform may determine a response to be signaled to the terminating user device for a legitimate call or an illegitimate call based on the call analytics and/or the other mitigation techniques. The signaling may be included as the verification status in the SIP INVITE.

The terminating user device may receive the SIP INVITE with the call information, and use the signaled information from the call security platform to indicate that the call is confirmed to be from a legitimate calling party or likely to be from an illegitimate source. In some implementations, the terminating user device may display (e.g., via a user interface) information indicating that the call is a robocall, a spoofed identity call, spam, and/or the like. Since the caller identity may be invalid, the called party may not answer the call with the terminating user device.

Figure 1D:
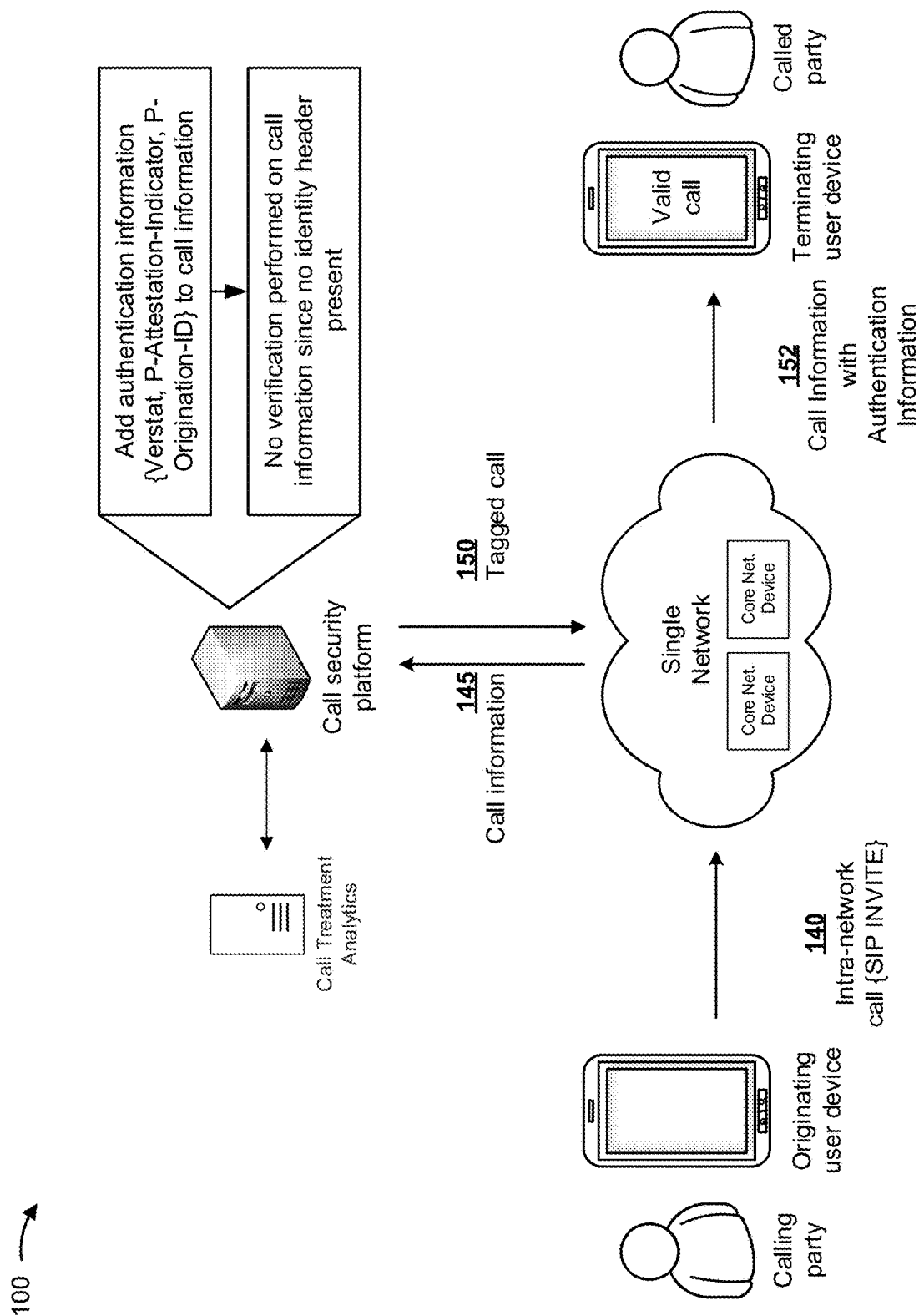

FIG. 1D shows an example of an intra-network call scenario, where the originating user device and the terminating user device may be associated with a single network. As shown in FIG. 1D, and by reference number 140, a calling party of the originating user device may cause the originating user device to generate a call request to the terminating user device. In some implementations, the intra-network call may include a SIP INVITE request that includes call information, such as a calling party identity indicating information associated with the calling party, the originating user device, and/or the like. The originating user device may provide the SIP INVITE to the single network, where it is received by a first network device (e.g. an IMS core network device, a non-IMS core network device).

As further shown in FIG. 1D, and by reference number 145, the call security platform may receive the call information from the single network. In some implementations, a first network device of the single network (e.g., an originating IMS core network device) may receive call information from the SIP INVITE or derive call information based on the SIP INVITE (for example, based on its origination information such as the source IP address, ingress port number, etc.), and may request action by the call security platform.

In some implementations, the call security platform may determine whether the calling party identity of the call is verified based on information provided by a service provider of the single network. For example, if the service provider of the single network can verify the calling party identity (e.g., that the call originated from a calling party legitimately subscribed to the service provider), the service provider may provide, to the call security platform, information indicating that the calling party identity is verified. In some implementations, and as further shown in FIG. 1D, the call security platform may add authentication information to the call information to generate a tagged call (e.g., the call tagged with the authentication information). In such implementations, the authentication information may indicate that the calling party identity is verified (e.g., not a spoofed identity), and that the calling party identity may be trusted. The authentication information may include, for example, a verification status (e.g., verstat), an attestation indicator (e.g., P-attestation-indicator), an origination identity (e.g., P-origination-ID), and/or the like, as described above.

As further shown in FIG. 1D, and by reference number 150, the call security platform may provide the call information including the authentication information to the single network. For example, the call security platform may provide the call information to the first network device that requested the authentication. The single network may forward the tagged SIP INVITE through the single network, to a second network device (e.g., a second IMS core network device, a second non-IMS core network device) of the single network. Upon determining that the SIP INVITE is to be routed to the terminating user device which is being served by the second network device and that the SIP INVITE does not include an identity header, the second network device forwards the SIP INVITE to the terminating user device (reference number 152). The SIP INVITE retains the call information with the authentication information, and the terminating user device can use this information to provide indications to the user as to the trusted (or untrusted) status of the calling party identity. For example, the terminating user device may display (e.g., via a user interface) information indicating that the caller identity has been determined to be valid. With assurance that the calling party identity is valid, the called party may choose to answer the call with the terminating user device.

Note that in the example of FIG. 1D, the call security platform may be used to tag calls (e.g., with the authentication information) made between parties over a single network infrastructure (e.g., a network not exposed to an untrusted network), but may not sign such calls (e.g., with the cryptographic signature). In this way, the call security platform may avoid computational costs associated with cryptographic signing for situations that do not require heightened levels of trust verification. Since no cryptographic signature is provided as part of the SIP INVITE, the call security platform may not perform a verification of the call information prior to transmission to the terminating user device.

Figure 1E:
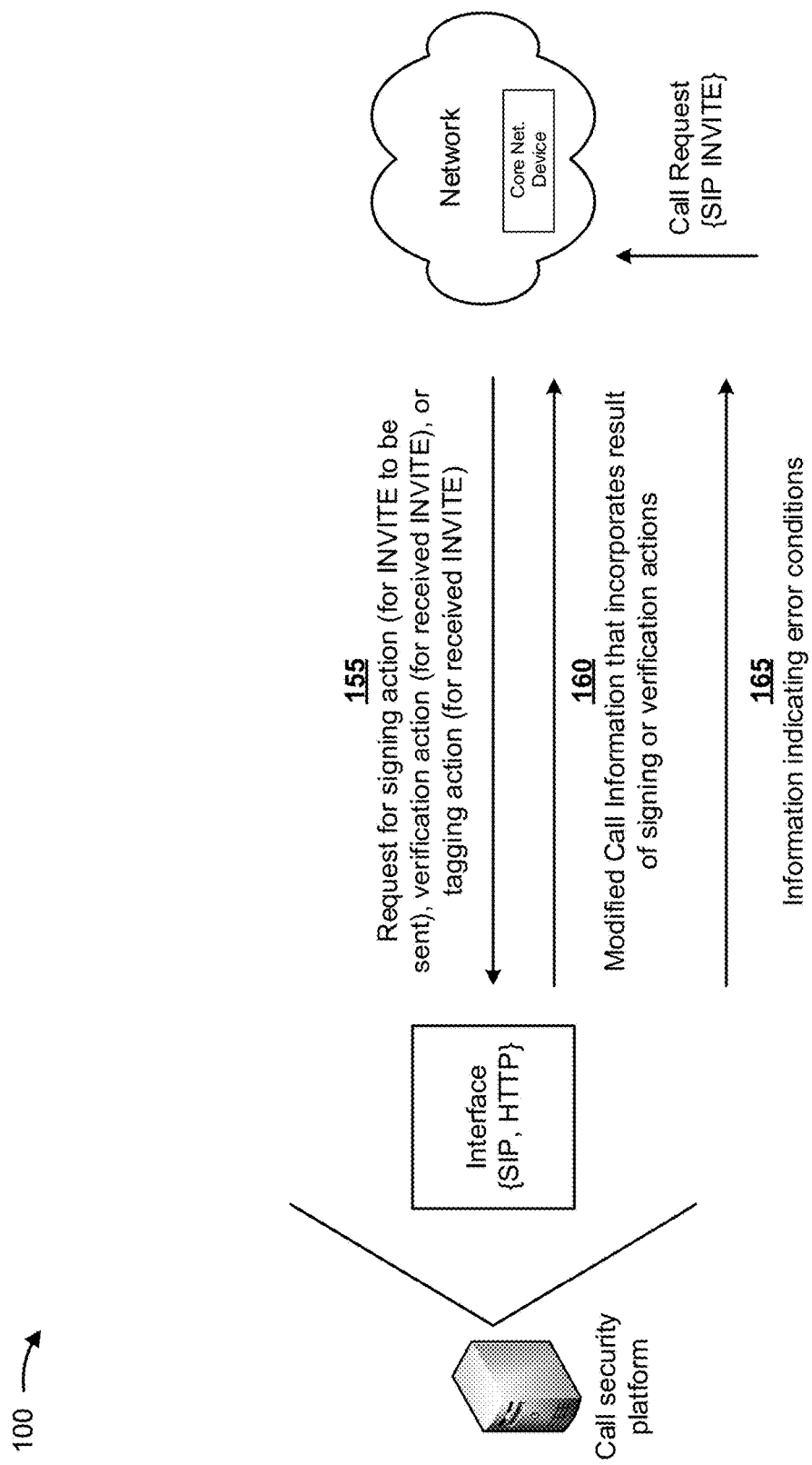

As shown in FIG. 1E, the call security platform may include an interface that permits communication with network devices provided in a network (e.g., an originating core network device, a terminating core network device, etc.). For example, as shown by reference number 155 in FIG. 1E, the interface may enable the call security platform to receive, from the network device, a request for a signing action for a call (e.g., a SIP INVITE) to be sent, a request for a verification action for a received call, or a request for tagging of a received call. In such an example, the call security platform may perform the signing action, verification action or tagging action, based on the request and as described above, and may provide information to modify call information to incorporate a result of the signing action, verification action or tagging action. As further shown in FIG. 1E, and by reference number 160, the interface may enable the call security platform to provide, to the network device, modified call information that incorporates the result of the signing, verification or tagging action, or in some implementations a modified SIP INVITE header that incorporates the result of the signing action, verification action or tagging action. As further shown in FIG. 1E, and by reference number 165, the interface may enable the call security platform to handle error conditions, and to provide, to the network device, information indicating error conditions associated with a call.

In some implementations, the call security platform interface may be implemented using a SIP-based interface, and the call security platform may receive service requests, for example, by sending the call request SIP INVITE to the call security platform acting as a SIP proxy. The call security platform may use the call information in the SIP INVITE to perform the requested signing action or verification action, and may modify the SIP INVITE to reflect the results of the action—for example, modifying the SIP INVITE header to include the authentication information and/or the identity header. The call security platform may then forward the SIP INVITE towards its destination or return it to the requesting network device. Such implementations may be beneficial to avoid processing delays by avoiding process steps. Alternatively, the network device may send a specially formatted SIP message to request the action, where the specially formatted SIP message includes the call information and any parameters needed to fulfill the request. The call security platform may then return a response to the specially formatted SIP message, and the requesting network device may then modify the SIP INVITE and forward the SIP INVITE towards its destination.

In some implementations, the interface may include an application programming interface (API) that enables communications between the call security platform and the network devices. Such an API may take the form of a Hypertext Transfer Protocol (HTTP) interface which permits network devices to make service requests, pass relevant request parameters and data, and receive results. In such implementations, a network device may request an action (signing, verification, tagging) with respect to a call request by making an API request that provides the parameters and call information in an HTTP GET or POST message. The call security platform may perform the requested action and provide the result as part of an HTTP response message. Among the benefits of implementing the interface with the call security platform as a API using HTTP include: allowing for scaling across multiple network elements and networks, allowing for redundancy and failover architectures, avoiding the call security platform as a failure point in call flow, avoiding the need to modify existing call flows and data records to accommodate additional failure modes, recovery mechanisms, and data collection requirements, and ability to extend the API for new features and use cases. Other benefits will also be apparent.

In an implementation using an HTTP interface, a network element may invoke a signing service of the call security platform by making an HTTP GET or POST request including certain parameters associated with the signing service, as well as call information from the SIP INVITE. Information may be passed in various formats, including HTTP header fields and HTTP content in JavaScript Object Notation (JSON), Extensible Markup Language (XML) or other formats. For example, FIG. 7A shows a HTTP POST request for signing, including signing request API parameters in a JSON object. The exemplary signing service API includes:

TABLE 1

HTTP Signing API

| | |
|---|---|
| Attestation | Attestation Code. |
| Origin | Originating Calling Identifier. Can be a telephony number. |
| Destination | Destination Called Identifier. Can be a telephony number. |
| Issued at Timestamp | Timestamp |
| OriginID | UUID generated per originating network device. |
| profileID (optional) | Profile ID for apply profiles. |

In some implementations, the HTTP POST request may include the SIP INVITE itself, in which case the call security platform may use the call information in the SIP INVITE to extract information applicable to the API. For example, as shown in FIG. 7B, the signing request includes a SIP INVITE that contains authentication information. The SIP INVITE may be parsed to determine the signing service API parameters:

TABLE 2

HTTP Signing API - Derived parameters (FIG. 7B)

| | |
|---|---|
| Attestation | "A" (from P-Attestation) |
| Origin | 12155551212 (from P-Asserted-Identity) |
| Destination | 12355551212 (from To header field) |
| Issued at Timestamp | Calculated from Date header |
| OriginID | "de305d54-75b4-431b-adb2-eb6b9e546014" (from P-origination-ID) |
| profileID | Not used |

Where a signing request includes both an API parameter object and the SIP INVITE, the call security platform may apply an order of precedence to determine which information to use as an API parameter (for example, a parameter from a supplied parameter object may take precedence over any SIP INVITE information for that parameter).

The origin parameter may be determined using a priority selection process, as the SIP INVITE may specify multiple potential valid identifiers of the origin. In one example, the selection process priority is: P-Asserted-Identity field, P-Preferred-Identity field, Remote Party ID field, From field. Other selection priorities may be used. Likewise the type of origin parameter may be determined from the origin parameter. For example, if the origin parameter starts with a "+" sign, includes numbers, or is a valid number per E.164 or a national numbering plan (e.g., NANP), then the origin parameter may be determined to be a telephony number.

In response to the signing request, the call security platform may provide an HTTP response message that includes the results of the signing. For example, where the signing activity is successful, the call security platform may provide an HTTP OK response, with the identity header information resulting from the signing activity. FIG. 7C illustrates a successful signing response message, including the resulting identity header in JSON format. In some implementations, the SIP INVITE (or some portion thereof) may be included in the HTTP OK response (see FIG. 7D), with the identity header included. If the signing activity is unsuccessful, the call security platform may provide an HTTP error message according to the nature of the signing failure. For example, FIG. 7E shows an HTTP 400 BAD REQUEST error message, including a JSON-formatted error object.

In an implementation using an HTTP interface, a network element may invoke a verification service of the call security platform by making an HTTP GET or POST request including certain parameters associated with the verification service, as well as call information from the SIP INVITE. Similar to the signing service, information may be passed in various formats, including HTTP header fields and HTTP content in JSON, XML, or other formats. For example, FIG. 8A shows an HTTP POST request for verification, including verification service API parameters in a JSON object. The exemplary verification service API includes:

TABLE 3

HTTP Verification API

| | |
|---|---|
| Origin | Originating Calling Identifier. Can be a telephony number. |
| Destination | Destination Called Identifier. Can be a telephony number. |
| Issued at Timestamp | Timestamp |
| Identity | Identity Header information. |
| profileID (optional) | Profile ID for apply profiles. |

In some implementations, the HTTP POST request may include the SIP INVITE itself, in which case the call security platform may use the call information in the SIP INVITE to extract information applicable to the API. For example, as shown in FIG. 8B, the verification request includes a SIP INVITE that contains identity information. The SIP INVITE may be parsed to determine the verification service API parameters:

TABLE 4

HTTP Verification API - Derived Parameters (FIG. 8B)

| | |
|---|---|
| Origin | 12155551212 (from P-Asserted-Identity) |
| Destination | 12355551212 (from To header field) |
| Issued at Timestamp | Calculated from Date header |
| Identity | "eyJhb . . . example.cert" (from Identity field) |
| profileID | Not used |

Similar to the signing service, where a verification request includes both an API parameter object and the SIP INVITE, the call security platform may apply an order of precedence to determine which information to use as an API parameter (for example, a parameter from a supplied parameter object may take precedence over any SIP INVITE information for that parameter). Similar to the signing service, the origin parameter may be determined using a priority selection process, as the SIP INVITE may specify multiple potential valid identifiers of the origin, and the origin parameter type can be determined by applying various rules to determine best fit. The identity parameter may be further parsed to extract a cryptographic signature and a URI for the public key to be used to decrypt the signature.

In response to the verification request, the call security platform may provide an HTTP response message that includes the results of the verification. For example, where the verification activity is successful, the call security platform may provide an HTTP OK response, with the authentication information resulting from the verification activity. FIG. 8C illustrates a successful verification response message, including the resulting authentication information in JSON format ("verstat":"TN-Validation-Passed"). In some implementations, the SIP INVITE (or some portion thereof) may be included in the HTTP OK response (see FIG. 8D), with the authentication information included. If the verification activity is unsuccessful, the call security platform may provide either an HTTP OK message or an HTTP error message depending on the nature of the verification failure. For example, FIG. 8E shows an HTTP 200 OK message that includes a JSON-formatted object indicating the results of the verification. In this case, the verification failed due to a bad certificate URI (possibly due to a spoofing attempt). In order to reflect this failure, the call security platform provides authentication information that indicates an authentication failure due to the content of the call information ("verstat":"TN-Validation-Failed"). As another example, FIG. 8F shows an HTTP 400 BAD REQUEST error message, including a JSON-formatted error object, for a situation where a mandatory parameter (iat) is missing from the request. Since this failure may be more likely due to system operation issues rather than call information problems (in this case a processing delay), a different error message is produced.

In an implementation using an HTTP interface, a network element may invoke a tagging service of the call security platform by making an HTTP GET or POST request including certain parameters associated with the tagging service, as well as call information from the SIP INVITE. Information may be passed in various formats, including HTTP header fields and HTTP content in JavaScript Object Notation (JSON), Extensible Markup Language (XML) or other formats. For example, FIG. 9A shows a HTTP POST request for tagging, including tagging request API parameters in a JSON object. The exemplary tagging service API includes:

TABLE 5

| HTTP Tagging API | |
| --- | --- |
| Attestation (optional) | Attestation Code. |
| Origin | Originating Calling Identifier. Can be a telephony number. |
| Destination | Destination Called Identifier. Can be a telephony number. |
| Issued at Timestamp | Timestamp |
| OriginID | UUID generated per originating network device. |
| profileID (optional) | Profile ID for apply profiles. |

In some implementations, the HTTP POST request may include the SIP INVITE itself, in which case the call security platform may use the call information in the SIP INVITE to extract information applicable to the API. For example, as shown in FIG. 9B, the tagging request includes a SIP INVITE that contains authentication information. The SIP INVITE may be parsed to determine the tagging service API parameters:

TABLE 6

| HTTP Tagging API - Derived parameters (FIG. 9B) | |
| --- | --- |
| Attestation | Not used |
| Origin | 12155551212 (from P-Asserted-Identity) |
| Destination | 12355551212 (from To header field) |
| Issued at Timestamp | Calculated from Date header |
| OriginID | Generated based on Network Device information. |
| profileID | Not used |

Similar to the signing service, where a tagging request includes both an API parameter object and the SIP INVITE, the call security platform may apply an order of precedence to determine which information to use as an API parameter (for example, a parameter from a supplied parameter object may take precedence over any SIP INVITE information for that parameter). Similar to the signing service, the origin parameter may be determined using a priority selection process, as the SIP INVITE may specify multiple potential valid identifiers of the origin, and the origin parameter type can be determined by applying various rules to determine best fit. The OriginID parameter may generated based on the identity of the network device making the request and/or other information in the request, according the rules for generating the OriginID UUIDs.

In response to the tagging request, the call security platform may provide an HTTP response message that includes the results of the tagging. For example, where the tagging activity is successful, the call security platform may provide an HTTP OK response, with the authentication information resulting from the tagging activity. FIG. 9C illustrates a successful tagging response message, including the resulting authentication information in JSON format. In some implementations, the SIP INVITE (or some portion thereof) may be included in the HTTP OK response (see FIG. 9D), with the identity header included.

Figure 1F:
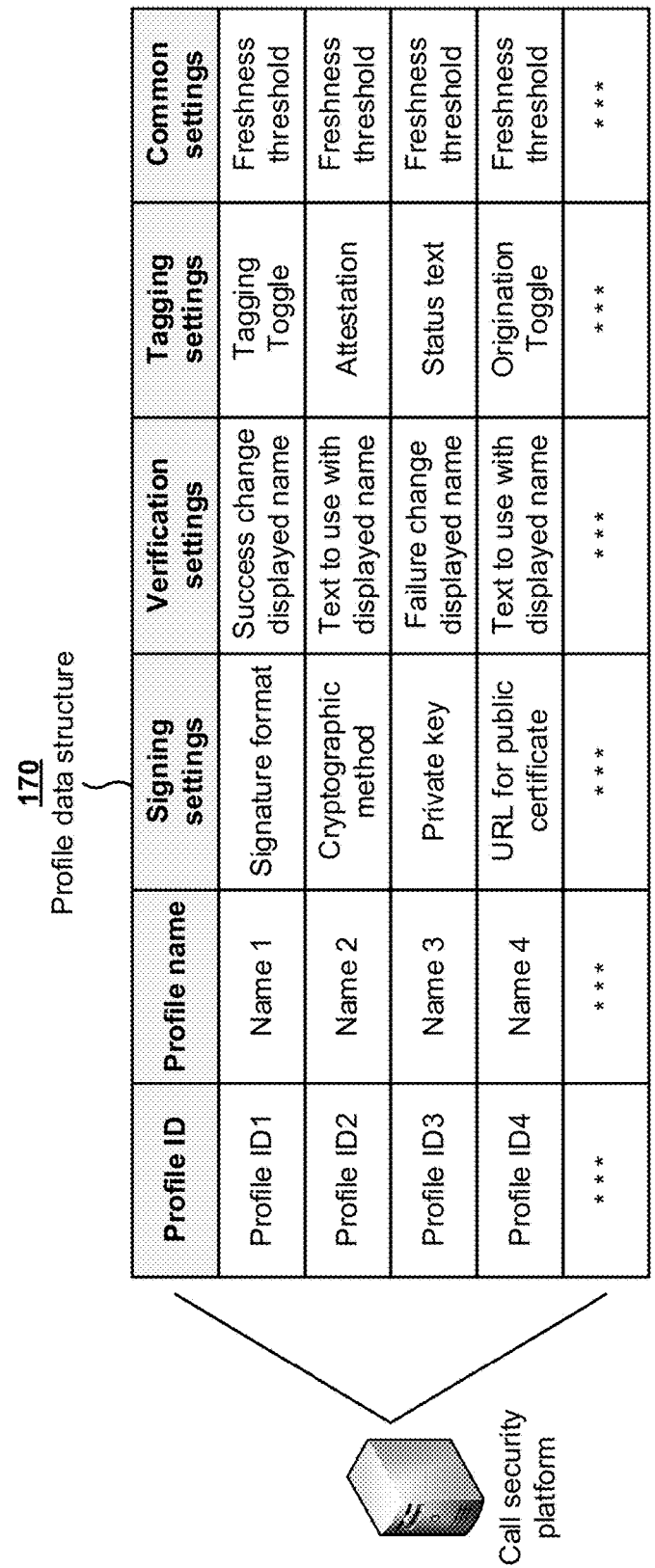

As shown in FIG. 1F, and by reference number 170, the call security platform may maintain a profile data structure (e.g., a table, a linked list, a database, and/or the like) that stores parameters associated with signature requests and verification requests. In some implementations, individual profiles may be referenced by a profile identifier (profileID) that is included in a request provided to the call security platform. When a request includes a profile ID, the call security platform may utilize the parameters associated with the profile ID to perform a signing action, a verification action, and/or the like, in lieu of any default parameters or any explicit parameters provided in a request.

As further shown in FIG. 1F, the profile data structure may include a profile ID field, a profile name field, one or more signing settings fields, one or more verification settings fields, one or more tagging settings fields, one or more common settings fields, and a variety of entries associated with the fields. The profile ID field may include an identifier for a profile (e.g., Profile ID1, Profile ID2, and/or the like). The profile name field may include a text name associated with the profile (e.g., Name 1, Name 2, and/or the like). The signing settings fields may include information associated with performing a signing activity, such as identifying a signature format for the profile (e.g., full, compact, both, and/or the like), identifying a cryptographic algorithm to use for the signature (e.g., an elliptic curve digital signature algorithm (ECDSA), a Rivest-Shamir-Adleman algorithm, and/or the like), a private key (or location thereof) for the signature, an identifier (e.g., a URI) of a location of a public certificate (e.g., a certificate authority) associated with the private key, and/or the like. The verification settings fields may include information associated with performing a verification activity, such as identifying how to change a displayed name (e.g., associated with a call) on successful verification, (e.g., no change, add as prefix, add as suffix, replace name with new text, and/or the like), text to use for and/or with the displayed name on successful verification, identifying how to change the displayed name on verification failure (e.g., no change, add as prefix, add as suffix, replace name with new text, and/or the like), text to use for and/or with the displayed name on verification failure, and/or the like. The tagging settings fields may include information associated with performing a tagging activity, such as a tagging toggle (e.g., to turn tagging on or off), an attestation coding parameter (e.g., to specify the attestation coding that should be applied), a status text parameter (e.g., to specify status text to use for verification status), an origination toggle (e.g., to turn on/off the use of origination IDs in authentication information), and the like. The common settings fields may include information to be used in signing and verification activities, such as identifying a freshness requirement associated with a request (e.g., fresh for a particular number of seconds).

In the example above of an implementation of the call security platform using an HTTP interface, the profileID may be included as a parameter in the API (as noted in Tables 1, 3 and 5).

Figure 1G:
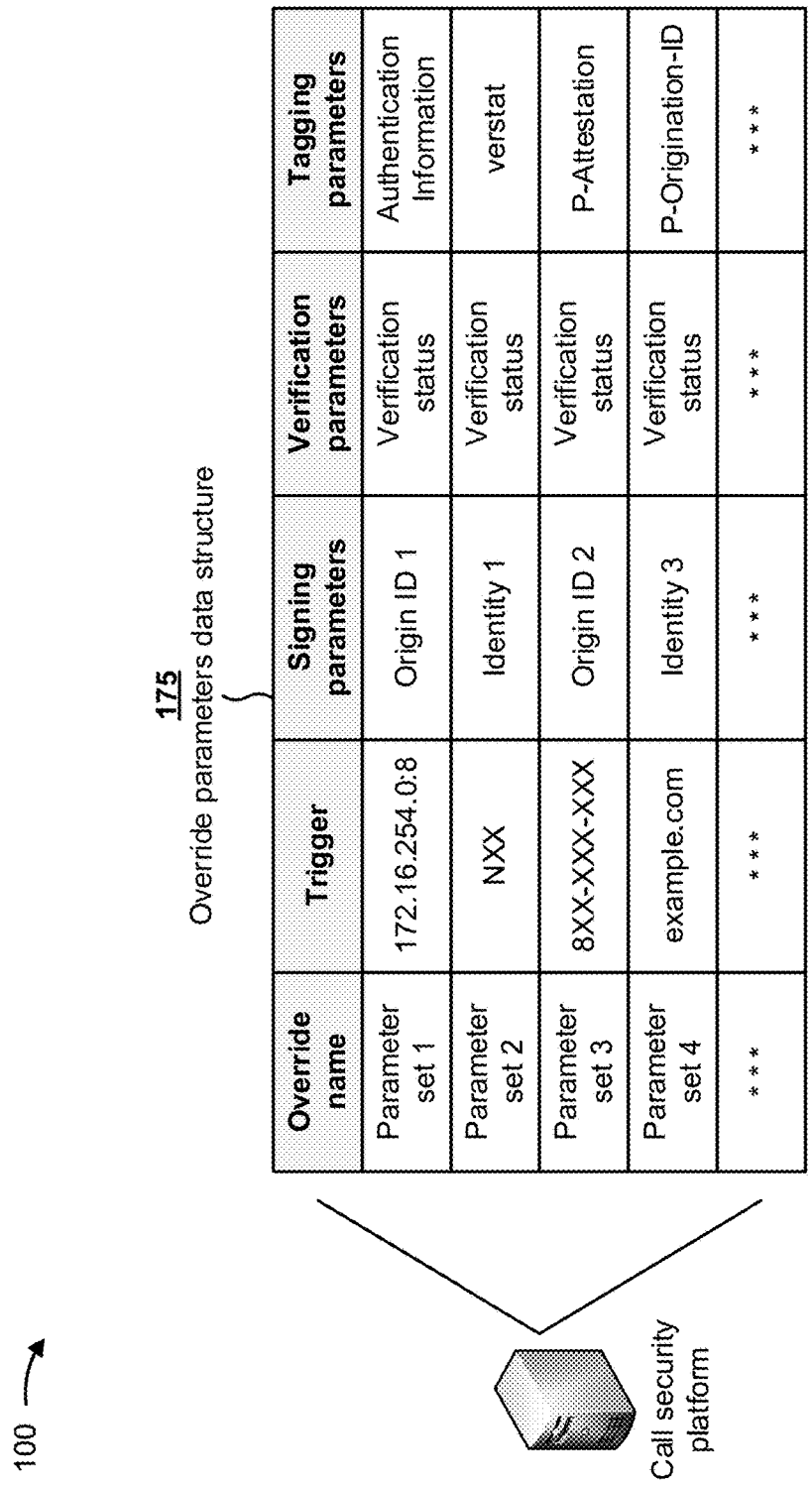

As shown in FIG. 1G, and by reference number 175, the call security platform may maintain an override parameters data structure (e.g., a table, a linked list, a database, and/or the like) that stores different override parameters to be used depending on the contents in a request. In some implementations, the call security platform may use the override parameters, in certain situations, for incoming requests instead of the normal tagging/signing/verification actions. This feature can be useful to allow for system testing, avoid processing of call situations that have been identified as not requiring call security platform processing (e.g., NXX calls, non-geographic numbers (8XX), etc.), as well as to convey information regarding certain use cases (e.g., that no signing should occur on a certain subnet of IP addresses).

As further shown in FIG. 1G, the override parameters data structure may include an override name field, one or more trigger fields, one or more signing parameters fields, one or more verification parameters fields, one or more tagging parameter fields, and a variety of entries associated with the fields. The override name field may include text that identifies an override parameter set. The trigger field may include information used to determine matches with incoming requests—if a request contains data that matches the trigger, the override is applied. For example, the call security platform may maintain a table of originating or terminating telephony numbers, SIP INVITE parameters, or API parameters that can be used to identify matching situations. In such situations, the table could contain entries that, for example, prevent activity for 911 or other N11 calls, non-geographic numbers (8XX), certain source IP subnets, certain source SIP domains, or other special calling situations.

The signing parameters fields may include information identifying the parameters that will be applied in the case of a signing action. In some embodiments, the signing parameters may include information applicable to signing actions, such as origin ID text that may be substituted for an origin ID of a request, an identity header that may be used in lieu of generation of signatures, and/or the like. The verification parameters fields may include information applicable to verification actions, such as identifying authentication information that will be used in lieu of generating a verification from an identity header, and the like. The tagging parameters fields may include information identifying the parameters that will be applied in the case of a tagging action. In some embodiments, the tagging parameters may include information applicable to tagging actions, such as authentication information (e.g., verstat, p-attestation and p-origination-id parameters) to be used in lieu of generating the authentication information, and/or the like.

Figure 1H:
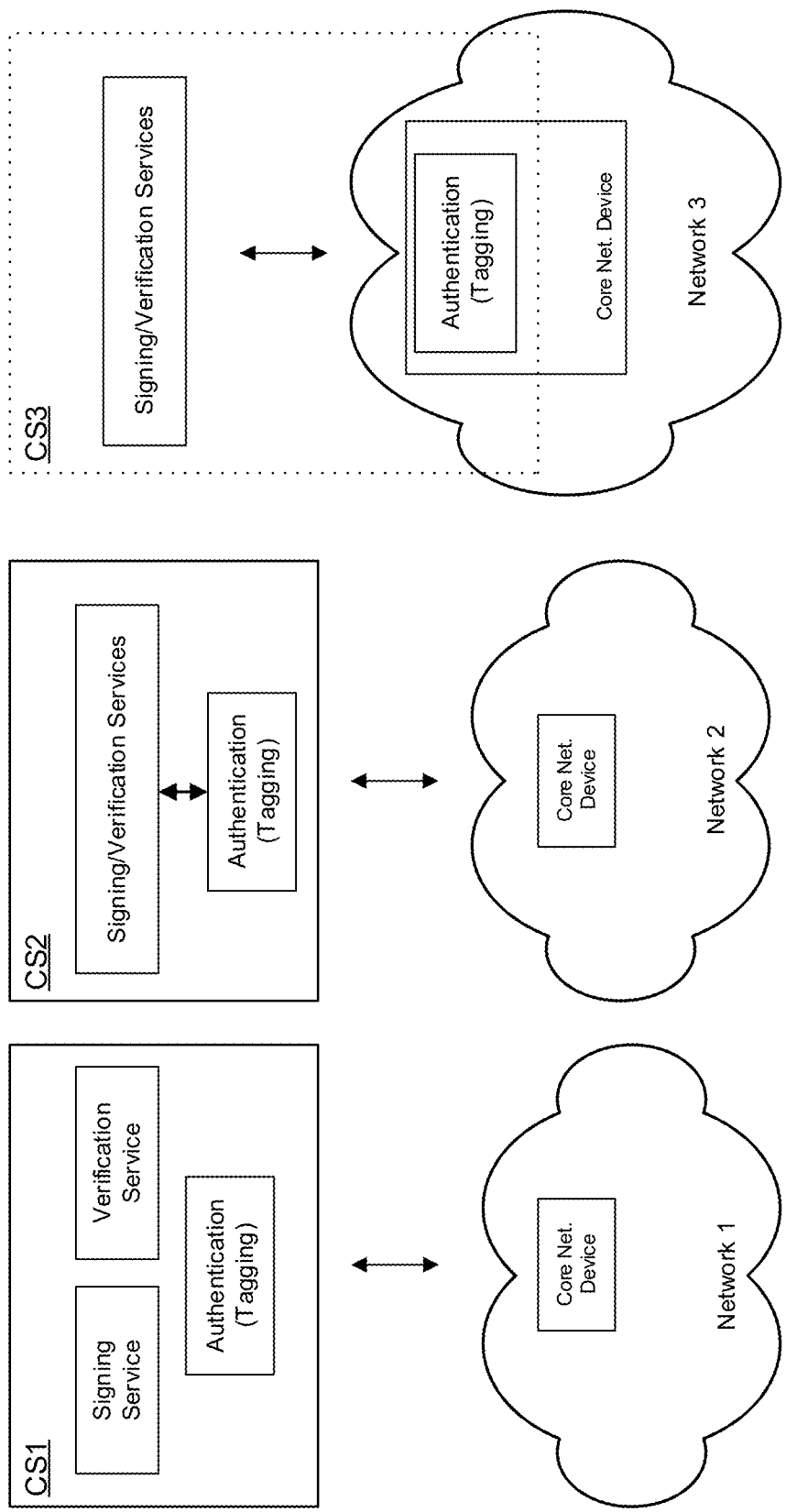

FIG. 1H shows an implementation that illustrates separation/distribution of the signing, verification and tagging services. FIG. 1H shows three separate networks Network 1, Network 2 and Network 3, each served by a respective call security platform CS1, CS2 and CS3. Network 1 uses the call security platform CS1 for signing, verification and authentication (tagging) services (as described above). Network 2 uses the call security platform CS2 for signing, verification and tagging, however the tagging service is deployed such that all service requests go through the tagging service before being sent to the signing or verification services. Network 3 uses the call security platform CS3 for signing, verification and tagging services, however the tagging service is implemented within the network elements of Network 3 (for example, as part of a core network device). There are various advantages and disadvantages of these configurations. Deploying the tagging service with the signing/verification services may decrease the workload of the network elements of Networks 1 and 2, but may likewise increase the workload of call security platform CS1 and CS2, and increase the processing time associated with tagging activities (e.g., due to the need to make a request to an external system). In contrast, putting the tagging service within Network 3's elements instead of with the signing/verification services may decrease the workload of the call security platform CS3 and decrease the processing time associated with tagging activities (for example, by avoiding external requests), but may likewise increase the workload of the network elements in Network 3 and increase the processing time associated with all traffic through Network 3. Using the tagging service in a pipelined configuration with the signing and verification services may allow for better filtering of requests that would result in failures or may be more efficient for situations where both services are needed (e.g., call analytics in the tagging service that may also be associated with verifications), but may increase processing time and create bottlenecks for request processing.

The modular capability of the signing, verification and tagging services allows a network operator flexibility in deploying the services among the network elements. In some implementation, the deployment may be dynamic, such that instances of the services may be deployed at external or internal (e.g., network element) locations depending on workloads, call request volume or timing, maintenance requirements, or other characteristics. As such the services may be implemented as virtualized network functions (VNFs) that may be instantiated and managed by the network orchestration systems of the network.

In this way, several different stages of the process for validating and securing caller identification to prevent identity spoofing are automated and secured in an efficient and scalable manner for carrier-grade communications networks, which improves speed and efficiency of the process, conserves computing resources (e.g., processing resources, memory resources, and/or the like), and imposes security across interconnected systems with varying levels of trust.

Furthermore, the call security platform may restore confidence in an authenticity of an originating call by providing information to a terminating network and a terminating party that assures that a calling party is legitimate (e.g., that a caller identity included in a SIP INVITE is valid and was created by an entity with authority to attest to an originating telephony number). The call security platform may also reduce time and resources utilized for trace back associated with identifying a source of illegal and unwanted robocalls.

As indicated above, FIGS. 1A-1H are provided merely as examples. Other examples are possible and may differ from what was described with regard to FIGS. 1A-1H.

Figure 2:
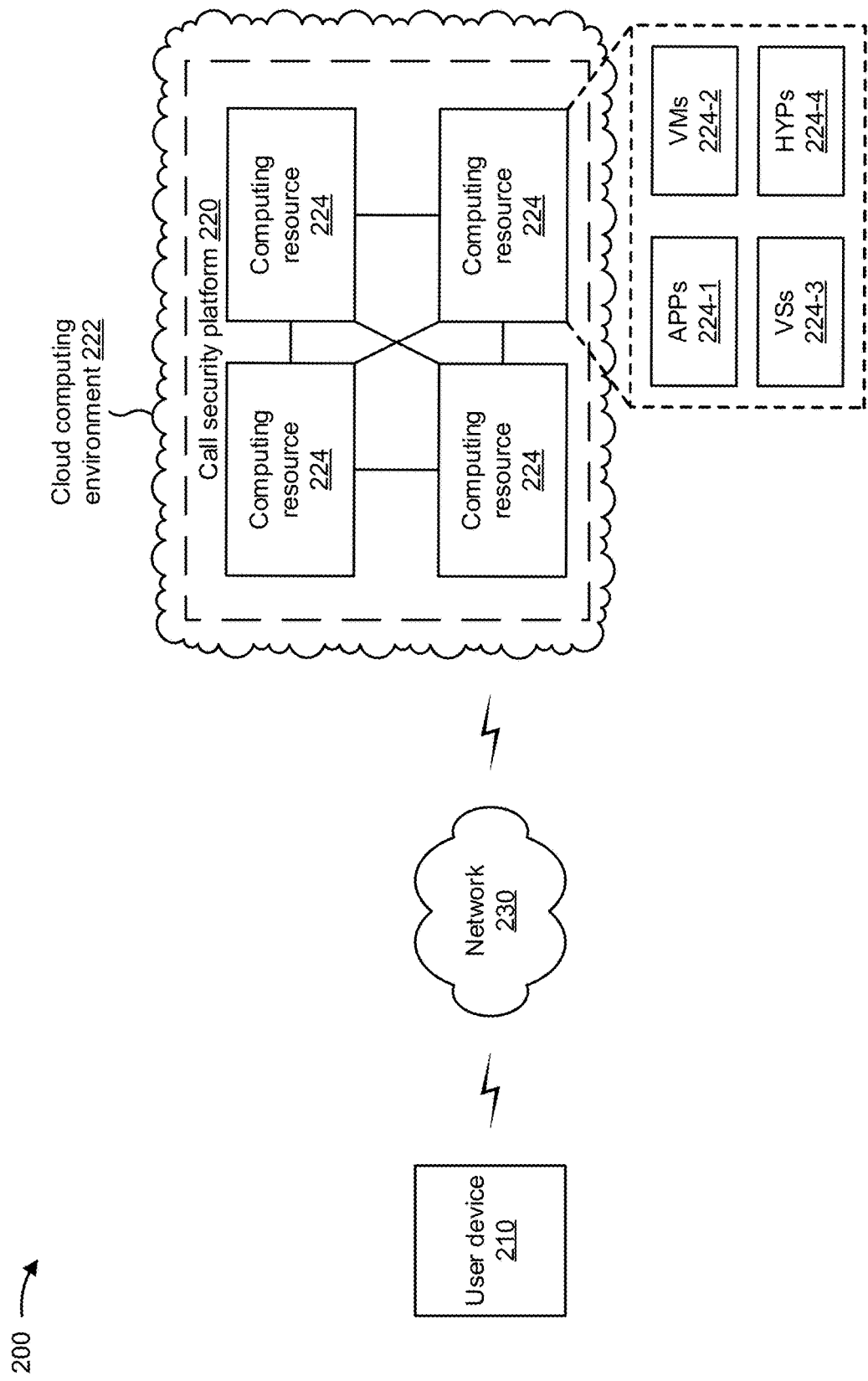
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a call security platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), automated dialing platform, or a similar type of device. In some implementations, user device 210 may receive information from and/or transmit information to call security platform 220.

Call security platform 220 includes one or more devices that validate and secure caller identification to prevent identity spoofing. In some implementations, call security platform 220 may be designed to be modular such that certain software components may be swapped in or out depending on a particular need. As such, call security platform 220 may be easily and/or quickly reconfigured for different uses. In some implementations, call security platform 220 may receive information from and/or transmit information to network 230 and/or one or more user devices 210.

In some implementations, as shown, call security platform 220 may be hosted in a cloud computing environment 222. Notably, while implementations described herein describe call security platform 220 as being hosted in cloud computing environment 222, in some implementations, call security platform 220 may not be cloud-based (i.e., may be implemented outside of a cloud computing environment) or may be partially cloud-based.

Cloud computing environment 222 includes an environment that hosts call security platform 220. Cloud computing environment 222 may provide computation, software, data access, storage, etc. services that do not require end-user knowledge of a physical location and configuration of system(s) and/or device(s) that host call security platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host call security platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with call security platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of call security platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
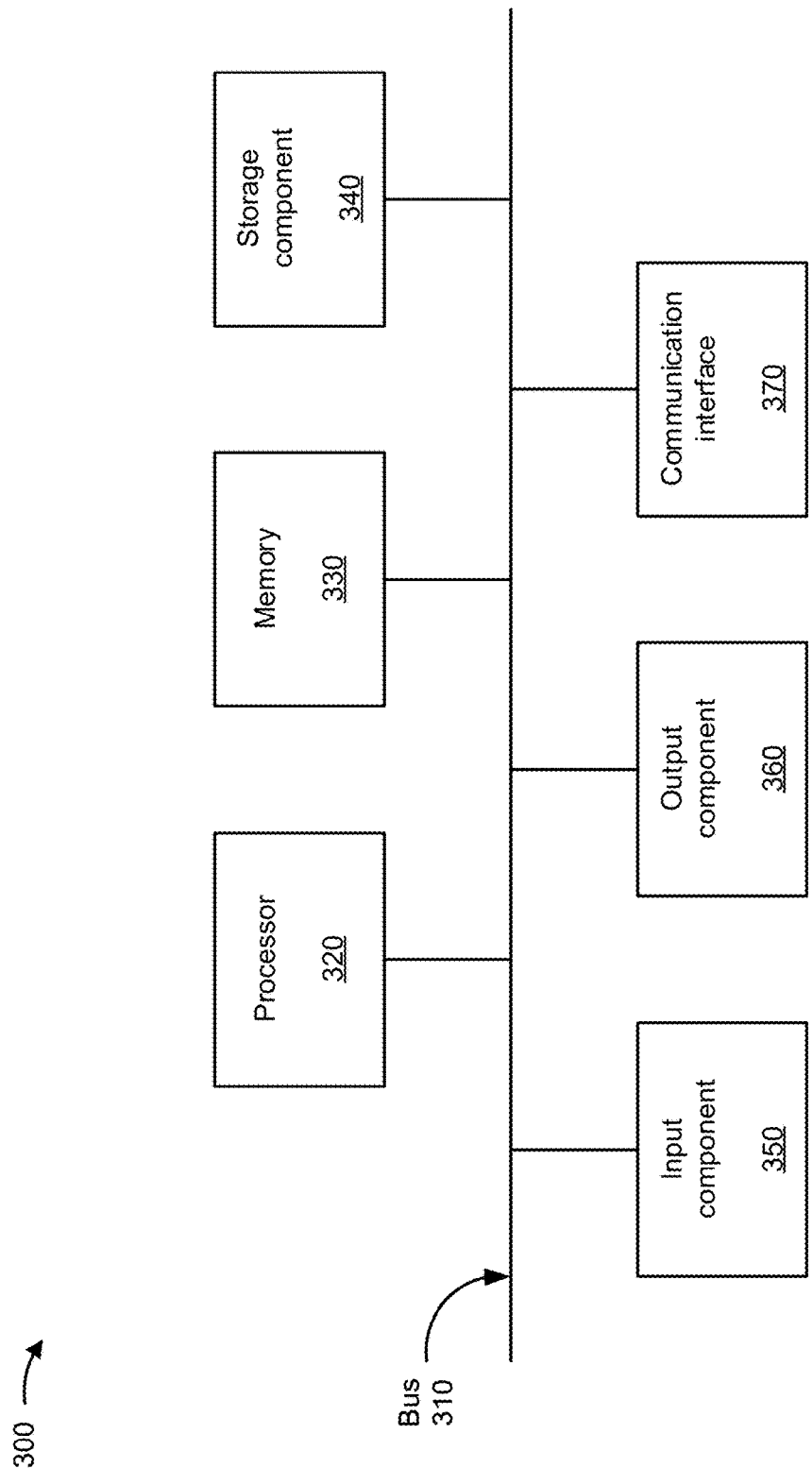
FIG. 3 is a diagram of example components of one or more devices of FIG. 2.

FIG. 3 is a diagram of example components of a device 300. Device 300 may correspond to user device 210, call security platform 220, and/or computing resource 224. In some implementations, user device 210, call security platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
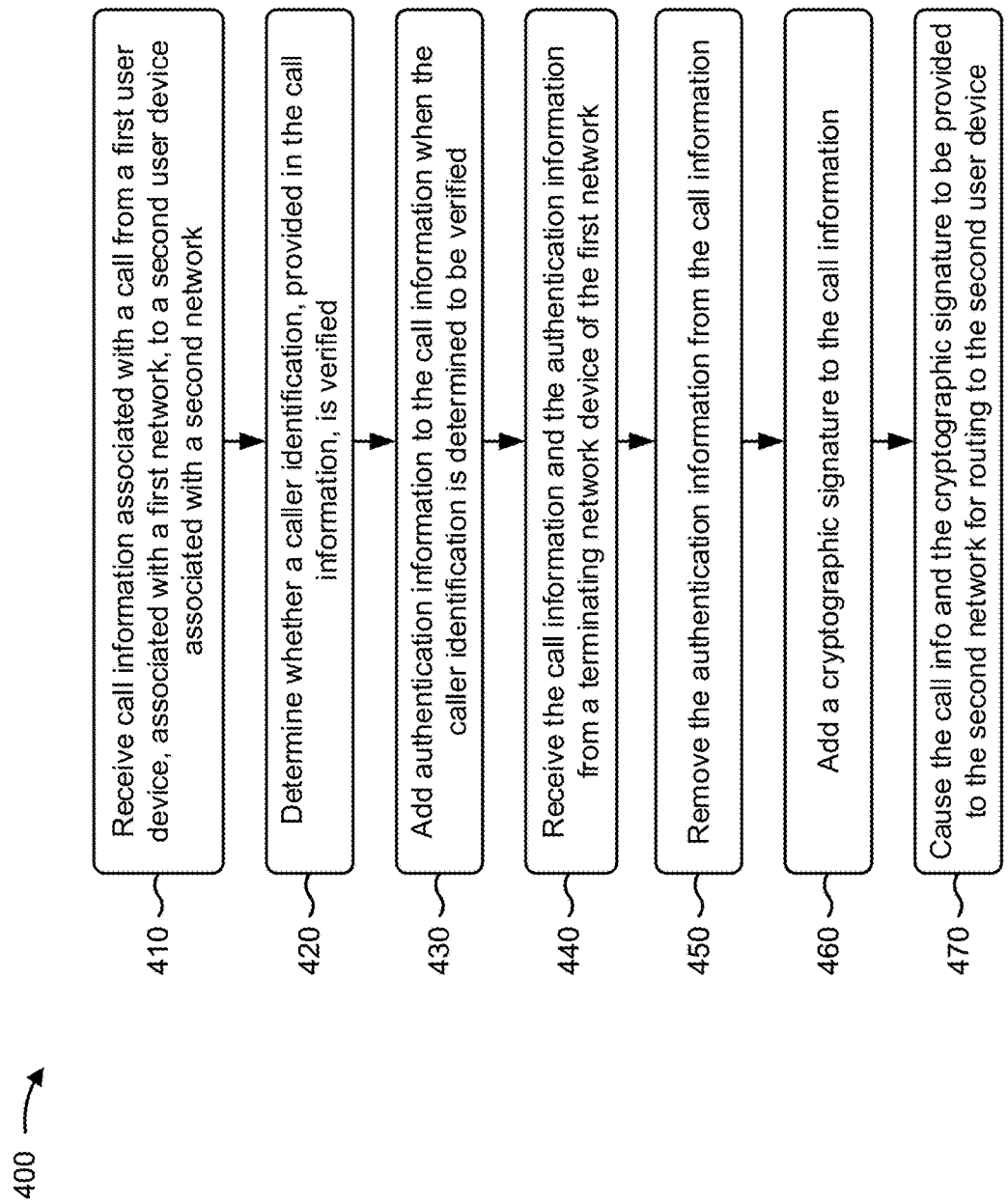
FIG. 4 is a flow chart of an example process for validating and securing caller identification to prevent identity spoofing.

FIG. 4 is a flow chart of an example process 400 for validating and securing caller identification to prevent identity spoofing. In some implementations, one or more process blocks of FIG. 4 may be performed by a call security platform (e.g., call security platform 220). In some implementations, one or more process blocks of FIG. 4 may be performed by another device or a group of devices separate from or including the call security platform, such as a user device (e.g., user device 210) or a network element.

As shown in FIG. 4, process 400 may include receiving call information associated with a call from a first user device to a second user device (block 410). For example, the call security platform (e.g., using computing resource 224, processor 320, communication interface 370, and/or the like) may receive call information associated with a call from a first user device to a second user device, as described above in connection with FIGS. 1A-2. In some implementations, the first user device may be associated with a first network, and the second user device may be associated with a second network that is separate from the first network. In some implementations, the call information may include a caller identification and may be received via an originating network device of the first network.

As further shown in FIG. 4, process 400 may include determining whether the caller identification is verified (block 420). For example, the call security platform (e.g., using computing resource 224, processor 320, memory 330, and/or the like) may determine whether the caller identification is verified, as described above in connection with FIGS. 1A-2.

As further shown in FIG. 4, process 400 may include adding authentication information to the call information when the caller identification is determined to be verified (block 430). For example, the call security platform (e.g., using computing resource 224, processor 320, storage component 340, and/or the like) may add authentication information to the call information when the caller identification is determined to be verified, as described above in connection with FIGS. 1A-2.

As further shown in FIG. 4, process 400 may include receiving the call information and the authentication information from a terminating network device of the first network (block 440). For example, the call security platform (e.g., using computing resource 224, processor 320, communication interface 370, and/or the like) may receive the call information and the authentication information from a terminating network device of the first network, as described above in connection with FIGS. 1A-2.

As further shown in FIG. 4, process 400 may include removing the authentication information from the call information (block 450). For example, the call security platform (e.g., using computing resource 224, processor 320, memory 330, and/or the like) may remove the authentication information from the call information, as described above in connection with FIGS. 1A-2.

As further shown in FIG. 4, process 400 may include adding a cryptographic signature to the call information (block 460). For example, the call security platform (e.g., using computing resource 224, processor 320, storage component 340, and/or the like) may add a cryptographic signature to the call information, as described above in connection with FIGS. 1A-2.

As further shown in FIG. 4, process 400 may include causing the call information and the cryptographic signature to be provided to the second network for routing to the second user device (block 470). For example, the call security platform (e.g., using computing resource 224, processor 320, communication interface 370, and/or the like) may cause the call information and the cryptographic signature to be provided to the second network for routing to the second user device, as described above in connection with FIGS. 1A-2.

Process 400 may include additional implementations, such as any single implementation or any combination of implementations described below and/or described with regard to any other process described herein.

In some implementations, when adding the authentication information to the call information, the call security platform may add, to the call information, a verification status indicating that the caller identification is verified (or not), an attestation identifier indicating the type/level of verification, and an origination identifier indicating origination information associated with the call. In some implementations, the call security platform may receive a private key from a data structure that stores a plurality of private keys, and may utilize the private key and the call information (e.g., an originating telephony number associated with the call) to generate the cryptographic signature. In some implementations, the call security platform may communicate with the first network via a hypertext transfer protocol (HTTP) interface that includes an application programming interface (API).

In some implementations, when determining whether the caller identification is verified, the call security platform may determine whether the caller identification is verified based on the one or more parameters. In some implementations, when adding the cryptographic signature to the call information, the call security platform may add the cryptographic signature to the call information based on the one or more parameters.

In some implementations, when the request includes a profile identifier, the call security platform may retrieve, from a profile data structure, one or more parameters associated with the profile identifier. In some implementations, the call security platform may retrieve, from an override parameters data structure, one or more verification override parameters, one or more signing override parameters and one or more tagging override parameters, may utilize the one or more verification override parameters to override a result of determining whether the caller identification is verified, may utilize the one or more signing override parameters to prevent generation of the cryptographic signature and may add the one or more signing override parameters to the call information, and may utilize the one or more tagging override parameters to prevent generation of the authentication information and may add the one or more tagging override parameters to the call information.

In some implementations, the first network may include an originating voice-over-Internet protocol (VoIP) network, and the second network may include a terminating VoIP network. In some implementations, the first and second networks may use IMS core network elements for call control and signaling.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
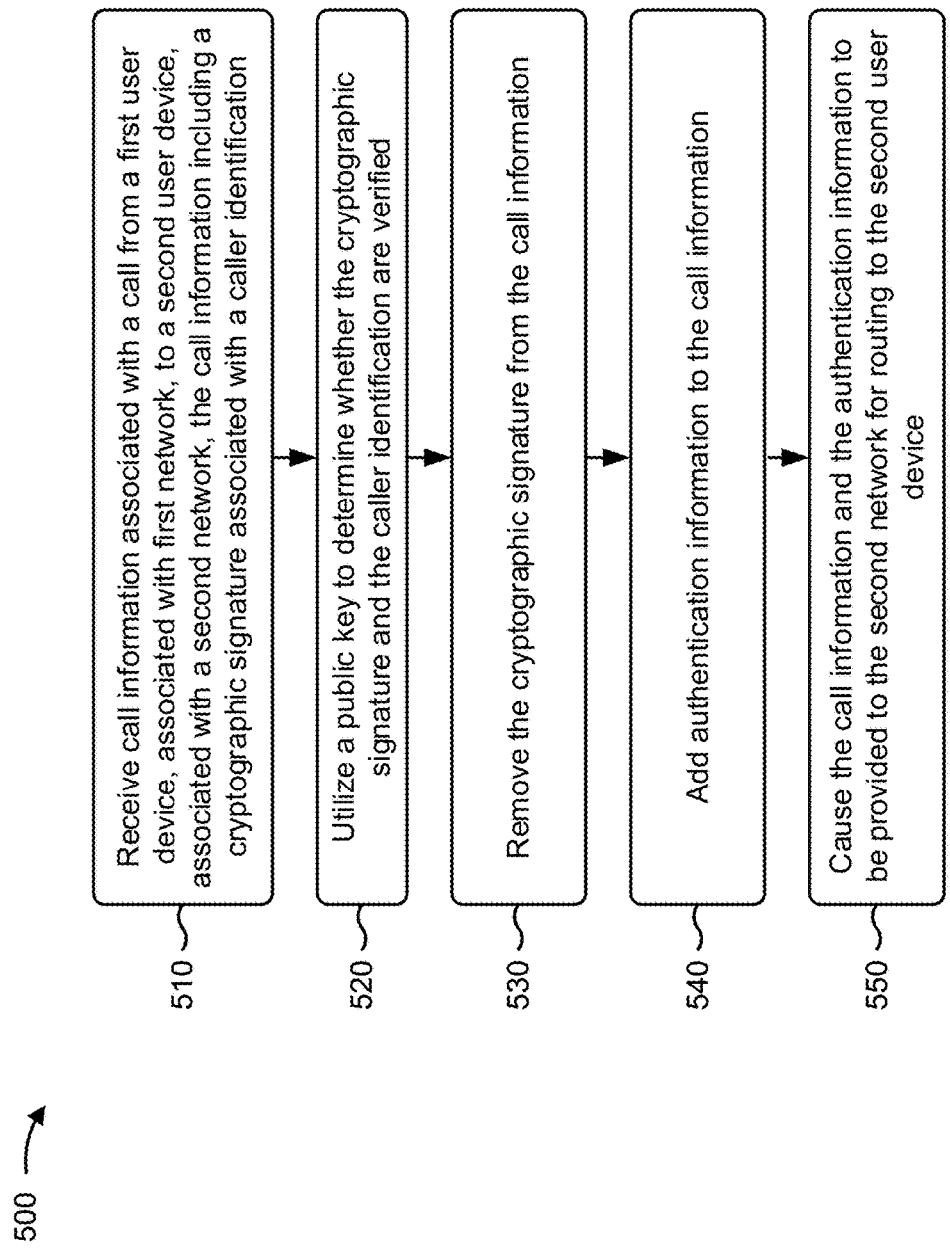
FIG. 5 is a flow chart of an example process for validating and securing caller identification to prevent identity spoofing.

FIG. 5 is a flow chart of an example process 500 for validating and securing caller identification to prevent identity spoofing. In some implementations, one or more process blocks of FIG. 5 may be performed by a call security platform (e.g., call security platform 220). In some implementations, one or more process blocks of FIG. 5 may be performed by another device or a group of devices separate from or including the call security platform, such as a user device (e.g., user device 210).

As shown in FIG. 5, process 500 may include receiving call information associated with a call from a first user device to a second user device, wherein the first user device is associated with a first network, the second user is associated with a second network that is separate from the first network, and the call information includes a cryptographic signature associated with a caller identification (block 510). For example, the call security platform (e.g., using computing resource 224, communication interface 370, and/or the like) may receive call information associated with a call from a first user device to a second user device, where the first user device is associated with a first network, the second user is associated with a second network that is separate from the first network, and the call information includes a cryptographic signature associated with a caller identification, as described above in connection with FIGS. 1A-2.

As further shown in FIG. 5, process 500 may include utilizing a public key to determine whether the cryptographic signature and the caller identification are verified (block 520). For example, the call security platform (e.g., using computing resource 224, processor 320, storage component 340, and/or the like) may utilize a public key to determine whether the cryptographic signature and the caller identification are verified, as described above in connection with FIGS. 1A-2.

As further shown in FIG. 5, process 500 may include removing the cryptographic signature from the call information when the cryptographic signature and the caller identification are determined to be verified (block 530). For example, the call security platform (e.g., using computing resource 224, processor 320, memory 330, and/or the like) may remove the cryptographic signature from the call information when the cryptographic signature and the caller identification are determined to be verified, as described above in connection with FIGS. 1A-2.

As further shown in FIG. 5, process 500 may include adding authentication information to the call information (block 540). For example, the call security platform (e.g., using computing resource 224, processor 320, storage component 340, and/or the like) may add authentication information to the call information when the cryptographic signature and the caller identification are determined to be verified, as described above in connection with FIGS. 1A-2. The call security platform may also add authentication information to the call information when the cryptographic signature and the caller identification are not determined to be verified, as described above in connection with FIGS. 1A-2.

As further shown in FIG. 5, process 500 may include causing the call information and the authentication information to be provided to the second network for routing to the second user device (block 550). For example, the call security platform (e.g., using computing resource 224, processor 320, communication interface 370, and/or the like) may cause the call information and the authentication information to be provided to the second network for routing to the second user device, as described above in connection with FIGS. 1A-2.

Process 500 may include additional implementations, such as any single implementation or any combination of implementations described below and/or described with regard to any other process described herein.

In some implementations, the call security platform may receive other call information associated with another call from the first user device to the second user device, where the other call information does not include the cryptographic signature, and may cause the other call information to be provided to the second network, for routing to the second user device, without altering the other call information. In some implementations, the authentication information may include a verification status indicating that the caller identification is verified.

In some implementations, the call security platform may identify, in the call information, a repository of public keys that are validated to owners of the public keys, and may request the public key from the repository of public keys. In some implementations, the device may communicate with the first network and the second network via a hypertext transfer protocol (HTTP) interface that includes an application programming interface (API).

In some implementations, when the call information includes a profile identifier, the call security platform may retrieve, from a profile data structure, one or more parameters associated with the profile identifier, and may determine whether the cryptographic signature and the caller identification are verified based on the one or more parameters. In some implementations, the call security platform may retrieve, from an override parameters data structure, one or more verification override parameters, and may utilize the one or more verification override parameters to override a result of determining whether the cryptographic signature and the caller identification are verified.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for validating and securing caller identification to prevent identity spoofing. In some implementations, one or more process blocks of FIG. 6 may be performed by a call security platform (e.g., call security platform 220). In some implementations, one or more process blocks of FIG. 6 may be performed by another device or a group of devices separate from or including the call security platform, such as a user device (e.g., user device 210).

As shown in FIG. 6, process 600 may include receiving call information associated with a call from a first user device to a second user device, wherein the first user device and the second user device are associated with a network, and wherein the call information includes a caller identification and being received via an originating network device of the network (block 610). For example, the call security platform (e.g., using computing resource 224, processor 320, communication interface 370, and/or the like) may receive call information associated with a call from a first user device to a second user device, wherein the first user device and the second user device are associated with a network, and wherein the call information includes a caller identification and being received via an originating network device of the network, as described above in connection with FIGS. 1A-2.

As further shown in FIG. 6, process 600 may include determining whether the caller identification is verified (block 620). For example, the call security platform (e.g., using computing resource 224, processor 320, storage component 340, and/or the like) may determine whether the caller identification is verified, as described above in connection with FIGS. 1A-2.

As further shown in FIG. 6, process 600 may include appending authentication information to the call information (block 630). For example, the call security platform (e.g., using computing resource 224, processor 320, memory 330, and/or the like) may append authentication information to the call information indicating that the caller identification is determined to be verified (or not), as described above in connection with FIGS. 1A-2.

As further shown in FIG. 6, process 600 may include receiving the call information and the authentication information from a terminating network device of the network (block 640). For example, the call security platform (e.g., using computing resource 224, processor 320, communication interface 370, and/or the like) may receive the call information and the authentication information from a terminating network device of the network, as described above in connection with FIGS. 1A-2.

As further shown in FIG. 6, process 600 may include determining that no verification of the call information and the authentication information is required since the call remains in the network (block 650). For example, the call security platform (e.g., using computing resource 224, processor 320, memory 330, and/or the like) may determine that no verification of the call information and the authentication information is required since the call remains in the network, as described above in connection with FIGS. 1A-2.

As further shown in FIG. 6, process 600 may include causing the call information and the authentication information to be provided to the second user device (block 660). For example, the call security platform (e.g., using computing resource 224, processor 320, communication interface 370, and/or the like) may cause the call information and the authentication information to be provided to the second user device, as described above in connection with FIGS. 1A-2.

Process 600 may include additional implementations, such as any single implementation or any combination of implementations described below and/or described with regard to any other process described herein.

In some implementations, the authentication information may include a verification status indicating that the caller identification is verified, an attestation header indicating that the caller identification is valid, and an origination identifier indicating origination information associated with the call. In some implementations, the call security platform may communicate with the originating network device and the terminating network device of the network via a hypertext transfer protocol (HTTP) interface that includes an application programming interface (API). In some implementations, the network may include a voice-over-Internet protocol (VoIP) network. In some implementations, the call may include a session initiation protocol (SIP) INVITE request.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide a call security platform that validates and secures caller identification to prevent identity spoofing. For example, the call security platform may receive call information associated with a call from a first user device to a second user device, where the first user device is associated with a first network, and the second user device is associated with a second network separate from the first network. The call information may include a caller identification and may be received via an originating network device of the first network. The call security platform may determine whether the caller identification is verified, and may add authentication information to the call information when the caller identification is verified. The call security platform may receive the call information and the authentication information from a terminating network device of the first network, and may remove the authentication information from the call information. The call security platform may add a cryptographic signature to the call information, and may cause the call information and the cryptographic signature to be provided to the second network for routing to the second user device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive call information associated with a call from a first user device to a second user device,
the first user device being associated with a first network,
the second user device being associated with a second network that is separate from the first network, and
the call information including a caller identification and being received via an originating network device of the first network;
determine whether the caller identification is verified;
add authentication information to the call information when the caller identification is determined to be verified;
receive the call information and the authentication information from a terminating network device of the first network;
remove the authentication information from the call information;
add a cryptographic signature to the call information; and cause the call information and the cryptographic signature to be provided to the second network for routing to the second user device.

2. The device of claim 1, wherein the one or more processors, when adding the authentication information to the call information, are to:
add, to the call information, a verification status indicating that the caller identification is verified;
add, to the call information, an attestation header indicating that the caller identification is valid; and
add, to the call information, an origination identifier indicating origination information associated with the call.

3. The device of claim 1, wherein the one or more processors are further to:
receive a private key from a data structure that stores a plurality of private keys; and
utilize the private key and an originating telephone number associated with the call to generate the cryptographic signature.

4. The device of claim 1, wherein the device communicates with the first network and the second network via a hypertext transfer protocol (HTTP) interface that includes an application programming interface (API).

5. The device of claim 1, wherein, when the call information includes a profile identifier, the one or more processors are further to:
retrieve, from a profile data structure, one or more parameters associated with the profile identifier;
wherein the one or more processors, when determining whether the caller identification is verified, are to:
determine whether the caller identification is verified based on the one or more parameters; and
wherein the one or more processors, when adding the cryptographic signature to the call information, are to:
add the cryptographic signature to the call information based on the one or more parameters.

6. The device of claim 1, wherein the one or more processors are further to:
retrieve, from an override parameters data structure, one or more verification override parameters and one or more signing override parameters;
utilize the one or more verification override parameters to override a result of determining whether the caller identification is verified;
utilize the one or more signing override parameters to prevent generation of the cryptographic signature; and
add the one or more signing override parameters to the call information.

7. The device of claim 1, wherein the first network includes an originating voice-over-Internet protocol (VoIP) network, and the second network includes a terminating VoIP network.

8. A non-transitory computer-readable medium storing instructions, the instructions comprising:
one or more instructions that, when executed by one or more processors of a device, cause the one or more processors to:
receive call information associated with a call from a first user device to a second user device,
the first user device being associated with a first network,
the second user device being associated with a second network that is separate from the first network, and
the call information including a caller identification and being received via an originating network device of the first network;
determine whether the caller identification is verified;
add authentication information to the call information when the caller identification is determined to be verified;
receive the call information and the authentication information from a terminating network device of the first network;
remove the authentication information from the call information;
add a cryptographic signature to the call information; and
cause the call information and the cryptographic signature to be provided to the second network for routing to the second user device.

9. The device of claim 8, wherein the one or more instructions, that cause the one or more processors to add the authentication information to the call information, cause the one or more processors to:
add, to the call information, a verification status indicating that the caller identification is verified;
add, to the call information, an attestation header indicating that the caller identification is valid; and
add, to the call information, an origination identifier indicating origination information associated with the call.

10. The non-transitory computer-readable medium of claim 8, wherein the one or more instructions that, when executed by the one or more processors, further cause the one or more processors to:
receive a private key from a data structure that stores a plurality of private keys; and
utilize the private key and an originating telephone number associated with the call to generate the cryptographic signature.

11. The non-transitory computer-readable medium of claim 8, wherein the device communicates with the first network and the second network via a hypertext transfer protocol (HTTP) interface that includes an application programming interface (API).

12. The non-transitory computer-readable medium of claim 8, wherein, when the call information includes a profile identifier, the one or more instructions, when executed by the one or more processors, further cause the one or more processors to:
retrieve, from a profile data structure, one or more parameters associated with the profile identifier;
wherein the one or more instructions that cause the one or more processors to determine whether the caller identification is verified, cause the one or more processors to:
determine whether the caller identification is verified based on the one or more parameters; and
wherein the one or more instructions that cause the one or more processors to add the cryptographic signature to the call information, cause the one or more processors to:
add the cryptographic signature to the call information based on the one or more parameters.

13. The non-transitory computer-readable medium of claim 8, wherein the one or more instructions, when executed by the one or more processors, further cause the one or more processors to:

retrieve, from an override parameters data structure, one or more verification override parameters and one or more signing override parameters;

utilize the one or more verification override parameters to override a result of determining whether the caller identification is verified;

utilize the one or more signing override parameters to prevent generation of the cryptographic signature; and add the one or more signing override parameters to the call information.

14. The device of claim 8, wherein the first network includes an originating voice-over-Internet protocol (VoIP) network, and the second network includes a terminating VoIP network.

15. A method, comprising:

receiving, by a device, call information associated with a call from a first user device to a second user device,
the first user device being associated with a first network,
the second user device being associated with a second network that is separate from the first network, and
the call information including a caller identification and being received via an originating network device of the first network;

determining, by the device, whether the caller identification is verified;

adding, by the device, authentication information to the call information when the caller identification is determined to be verified;

receiving, by the device, the call information and the authentication information from a terminating network device of the first network;

removing, by the device, the authentication information from the call information;

adding, by the device, a cryptographic signature to the call information; and causing, by the device, the call information and the cryptographic signature to be provided to the second network for routing to the second user device.

16. The method of claim 15, wherein adding the authentication information to the call information comprises:

adding, to the call information, a verification status indicating that the caller identification is verified;

adding, to the call information, an attestation header indicating that the caller identification is valid; and adding, to the call information, an origination identifier indicating origination information associated with the call.

17. The method of claim 15, further comprising:

receiving a private key from a data structure that stores a plurality of private keys; and utilizing the private key and an originating telephone number associated with the call to generate the cryptographic signature.

18. The method of claim 15, wherein the device communicates with the first network and the second network via a hypertext transfer protocol (HTTP) interface that includes an application programming interface (API).

19. The method of claim 15, wherein, when the call information includes a profile identifier, the method further comprises:

retrieving, from a profile data structure, one or more parameters associated with the profile identifier;

wherein determining whether the caller identification is verified comprises:
determining whether the caller identification is verified based on the one or more parameters; and wherein adding the cryptographic signature to the call information comprises:
adding the cryptographic signature to the call information based on the one or more parameters.

20. The method of claim 15, further comprising:

retrieving, from an override parameters data structure, one or more verification override parameters and one or more signing override parameters;

utilizing the one or more verification override parameters to override a result of determining whether the caller identification is verified;

utilizing the one or more signing override parameters to prevent generation of the cryptographic signature; and adding the one or more signing override parameters to the call information.

* * * * *